(12) United States Patent
Speer et al.

(10) Patent No.: US 12,651,269 B2
(45) Date of Patent: Jun. 9, 2026

(54) SYSTEM AND METHOD FOR APP CERTIFICATION

(71) Applicant: Harman International Industries, Incorporated, Stamford, CT (US)

(72) Inventors: Ryan Speer, Libertyville, IL (US); Naoki Ogishi, Redwood City, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 18/725,397

(22) PCT Filed: Dec. 29, 2022

(86) PCT No.: PCT/US2022/054287
§ 371 (c)(1),
(2) Date: Jun. 28, 2024

(87) PCT Pub. No.: WO2023/129677
PCT Pub. Date: Jul. 6, 2023

(65) Prior Publication Data
US 2025/0086654 A1      Mar. 13, 2025

Related U.S. Application Data

(60) Provisional application No. 63/295,352, filed on Dec. 30, 2021, provisional application No. 63/295,399,
(Continued)

(51) Int. Cl.
*G06Q 30/018*      (2023.01)

(52) U.S. Cl.
CPC .................................. *G06Q 30/018* (2013.01)

(58) Field of Classification Search
CPC ..................................................... G06Q 30/018
See application file for complete search history.

(56) References Cited

U.S. PATENT DOCUMENTS 11,960,383 B2 * 4/2024 Gottlieb .............. G06F 11/3438
12,106,074 B2 * 10/2024 Ghosh ..................... G06F 8/316
(Continued)

FOREIGN PATENT DOCUMENTS

EP            2333657 A1      6/2011

OTHER PUBLICATIONS

Fred Feng et al., A Computer-Aided Usability Testing Tool for In-Vehicle Infotainment Systems, May 19, 2017, Computers & Industrial Engineering, www.elsevier.com, whole document (Year: 2017).*

(Continued)

*Primary Examiner* — John W Hayes

(74) *Attorney, Agent, or Firm* — Angela M. Brunetti

(57) ABSTRACT

A system and method for a web-based portal for certification of an application software (App). A draft App is created and submitted, by an App developer, to the web-based portal where a mediate administrator reviews, approves, or rejects the draft App based on a set of targets set by an App provider. The mediate administrator communicates rejection of the draft App to the developer. The mediate administrator communicates approval of the draft App to the developer and to one or more providers. The one or more providers perform their own review of the App and may modify the approved App with further target attributes. An approved App is published by the developer. An approved and/or modified approved App may be offered to a user by way of an in-vehicle infotainment system.

3 Claims, 22 Drawing Sheets

Related U.S. Application Data filed on Dec. 30, 2021, provisional application No. 63/295,368, filed on Dec. 30, 2021.

(56) References Cited

U.S. PATENT DOCUMENTS

| | | | |
|---|---|---|---|
| 2008/0092107 A1 | 4/2008 | Mcwilliam et al. | |
| 2009/0013310 A1 | 1/2009 | Arner et al. | |
| 2015/0099495 A1* | 4/2015 | Crosbie | H04W 4/18 |
| | | | 455/414.3 |
| 2017/0142156 A1* | 5/2017 | Shiraishi | G06F 21/52 |
| 2018/0113802 A1* | 4/2018 | Yeddnapuddi | G06F 11/0751 |
| 2023/0205670 A1* | 6/2023 | Cardoso | G06F 11/3692 |
| | | | 717/126 |

OTHER PUBLICATIONS

Parampreet Kaur et al., "A Modeling Framework for Automotive Software Design and Optimal Test Path Generation", 2018, Journal of Intelligent & Fuzzy Systems (Year: 2018).*

* cited by examiner

Company Store - Admin Console

Applications  Services

OEM 1 | OEM 2 | OEM 3 ⋯ ☺ ⊕ Username | Company Int ⑦

Submitted Applications

| | Application Name | Publisher | Version | | | ↓ Submitted |
|---|---|---|---|---|---|---|
| Submitted (9) | | | | | | |
| In Certification (6) | 🖼 Cabin Talk<br>package id | Company Int. | v.1.2.0 | In Review | 15 Jan 2020 | Jon Doe<br>Company QA |
| Final Review (3) | 🖼 Automotive Dex<br>package id | Company Int. | v.1.3.0 | In Review | 15 Jan 2020 | Jon Doe<br>Company QA |
| Approved (2) | 🖼 Commerce<br>package id | Company Int. | v.5.0.1 | In Review | 15 Jan 2020 | Jon Doe<br>Company QA |
| Published (156) | 🖼 Internet<br>package id | Company Int. | v.4.1.7 | In Review | 14 Jan 2020 | Jon Doe<br>Company QA |
| Deleted (5) | 🖼 OMS<br>package id | Company Int. | v.2.3.4 | In Review | 14 Jan 2020 | Jon Doe<br>Company QA |
| | 🖼 Marketplace<br>package id | Company Int. | v.27.0.0 | In Review | 13 Jan 2020 | Jon Doe<br>Company QA |
| | 🖼 Messenger<br>package id | Company Int. | v.5.0.0 | In Review | 12 Jan 2020 | Jon Doe<br>Company QA |
| | 🖼 Settings<br>package id | Company Int. | v.4.0.2 | In Review | 12 Jan 2020 | Jon Doe<br>Company QA |
| | 🖼 SVM<br>package id | Company Int. | v.12.2.0 | In Review | 10 Jan 2020 | Jon Doe<br>Company QA |

FIG. 2B

FIG. 5
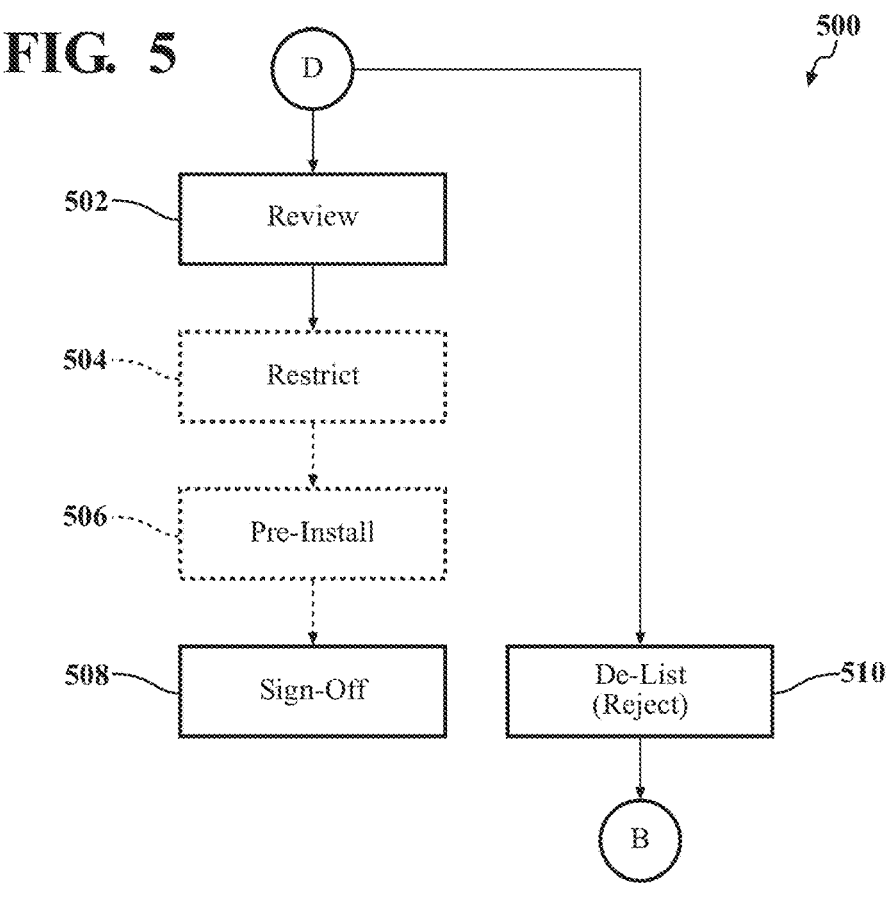
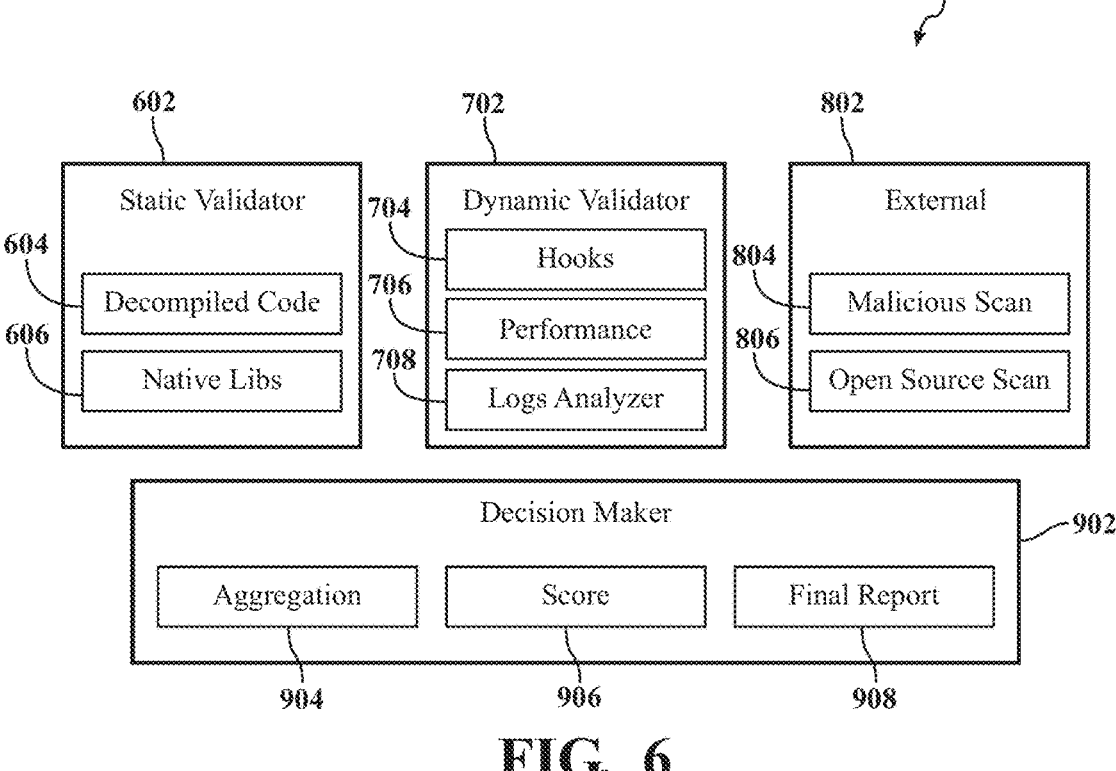
FIG. 6

1100

Automotive APK Validator Report                    Report Date:

1102b    1102a                                1102                        1104

 Logo    Company Name                              4.0

Company is a digital music, podcast, and video streaming
service that gives you access to millions of songs and
other content from artists all over the world.
                                              1102c
Company Ltd.  |  Entertainment  |  v3.2 08/02/20                        Automotive Grade Score 1102a            1102d

| Privacy | Performance | Distraction | Security | Maliciousness |
|---|---|---|---|---|
| 4 | 3 | 4 | 4 | 5 |
| ★★★★☆ | ★★★☆☆ | ★★★★☆ | ★★★★☆ | ★★★★★ |

Analysts Summary    1106

While the Security Privacy and Driver Distraction parameters are Automotive compatible, the
performance of the App might not be suitable for in Vehicle Infotainment systems.
Recommend to configure the App not to cache data in automotive applications.

Top Failed Tests    1108

| | Volume | App can change volume controls. | Distraction | ✕ |
| | Trackers | A tracker is meant to collect data about the user. | Privacy | ✕ |

Automotive APK Validator Report    1102b    Report Date:

Logo    1102

1104

0.0

Company is a SMSFraud/WAPBilling malware

1102a

Automotive Fitness Score

| Privacy | Performance | Distraction | Security | Maliciousness |
|---------|-------------|-------------|----------|---------------|
| 5 | N/A | 2 | 2 | 0 |
| ★★★★★ | ☆☆☆☆☆ | ★★☆☆☆ | ★★☆☆☆ | ☆☆☆☆☆ |

Analysts Summary    1106

Obviously this is a known malware of the Company family, a large-scale billing fraud family. Company used just about every cloaking and obfuscation technique under the sun in an attempt to go undetected. Company originally performed SMS fraud, but have largely abandoned this for WAP billing.

Top Failed Tests    1108

| | Volume | App can change volume controls. | Distraction | ✕ |
|---|--------|-------------------------------|-------------|---|
| | Anti-Virus | Detected as malware | Maliciousness | ✕ |
| | Http | App is using non secure communication. | Security | ✕ |
| | Wi-Fi Enable | App wants to control Wi-Fi power | Security | ✕ |
| | Install App | App is trying to install another app | Security | ✕ |

Figure 9A:
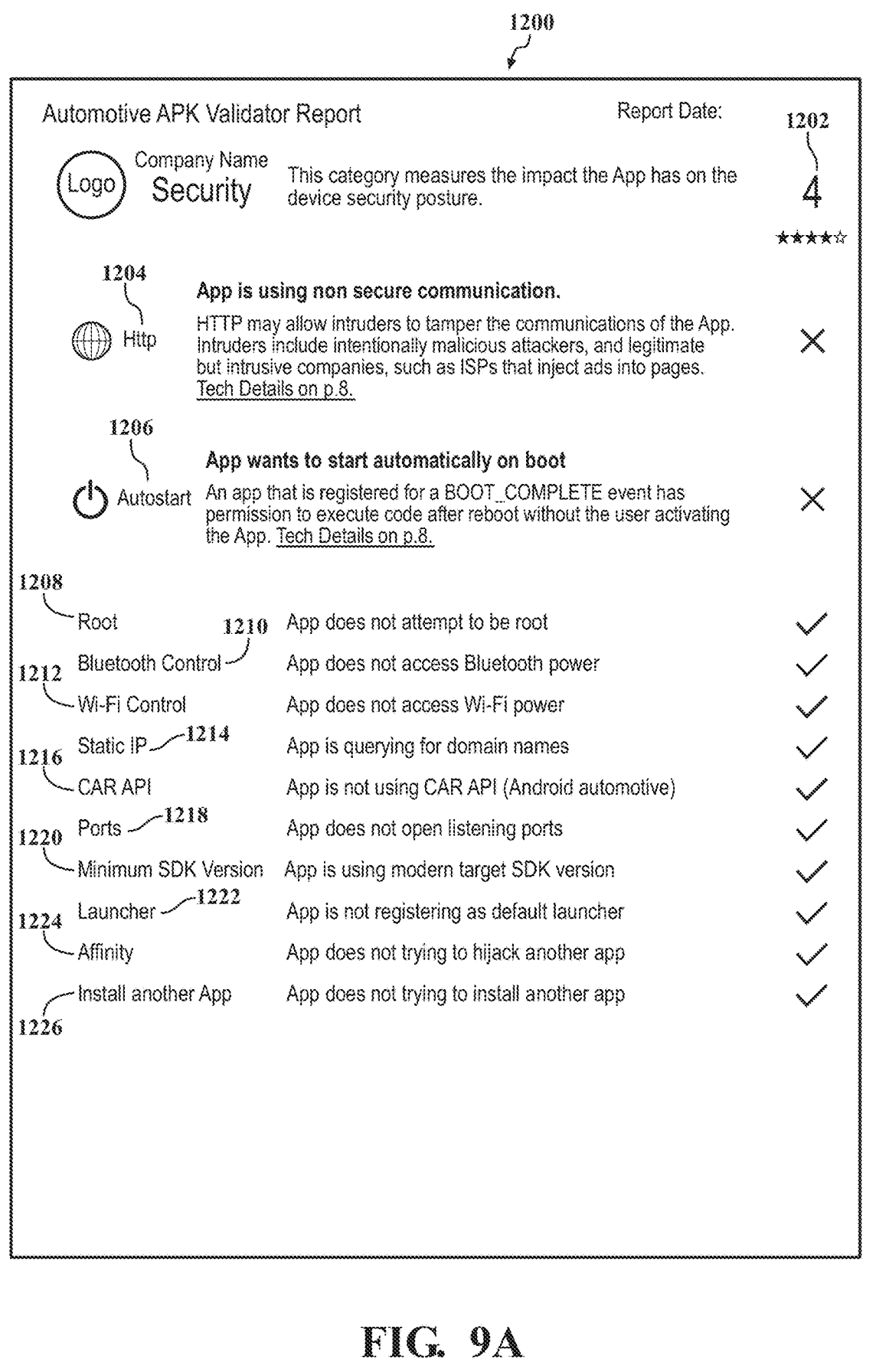

Automotive APK Validator Report      Report Date:    1202

(Logo) Company Name
Security    This category measures the impact the App has on the device security posture.     4

★★★★☆

1204

App is using non secure communication.

🌐 Http    HTTP may allow intruders to tamper the communications of the App. Intruders include intentionally malicious attackers, and legitimate but intrusive companies, such as ISPs that inject ads into pages. <u>Tech Details on p.8.</u>     ✕

1206

App wants to start automatically on boot

⏻ Autostart    An app that is registered for a BOOT_COMPLETE event has permission to execute code after reboot without the user activating the App. <u>Tech Details on p.8.</u>     ✕

| 1208 Root | 1210 | App does not attempt to be root | ✓ |
| 1212 Bluetooth Control | | App does not access Bluetooth power | ✓ |
| Wi-Fi Control | | App does not access Wi-Fi power | ✓ |
| 1216 Static IP | 1214 | App is querying for domain names | ✓ |
| CAR API | | App is not using CAR API (Android automotive) | ✓ |
| 1220 Ports | 1218 | App does not open listening ports | ✓ |
| Minimum SDK Version | | App is using modern target SDK version | ✓ |
| 1224 Launcher | 1222 | App is not registering as default launcher | ✓ |
| Affinity | | App does not trying to hijack another app | ✓ |
| Install another App | | App does not trying to install another app | ✓ |
1226

Figure 9B:
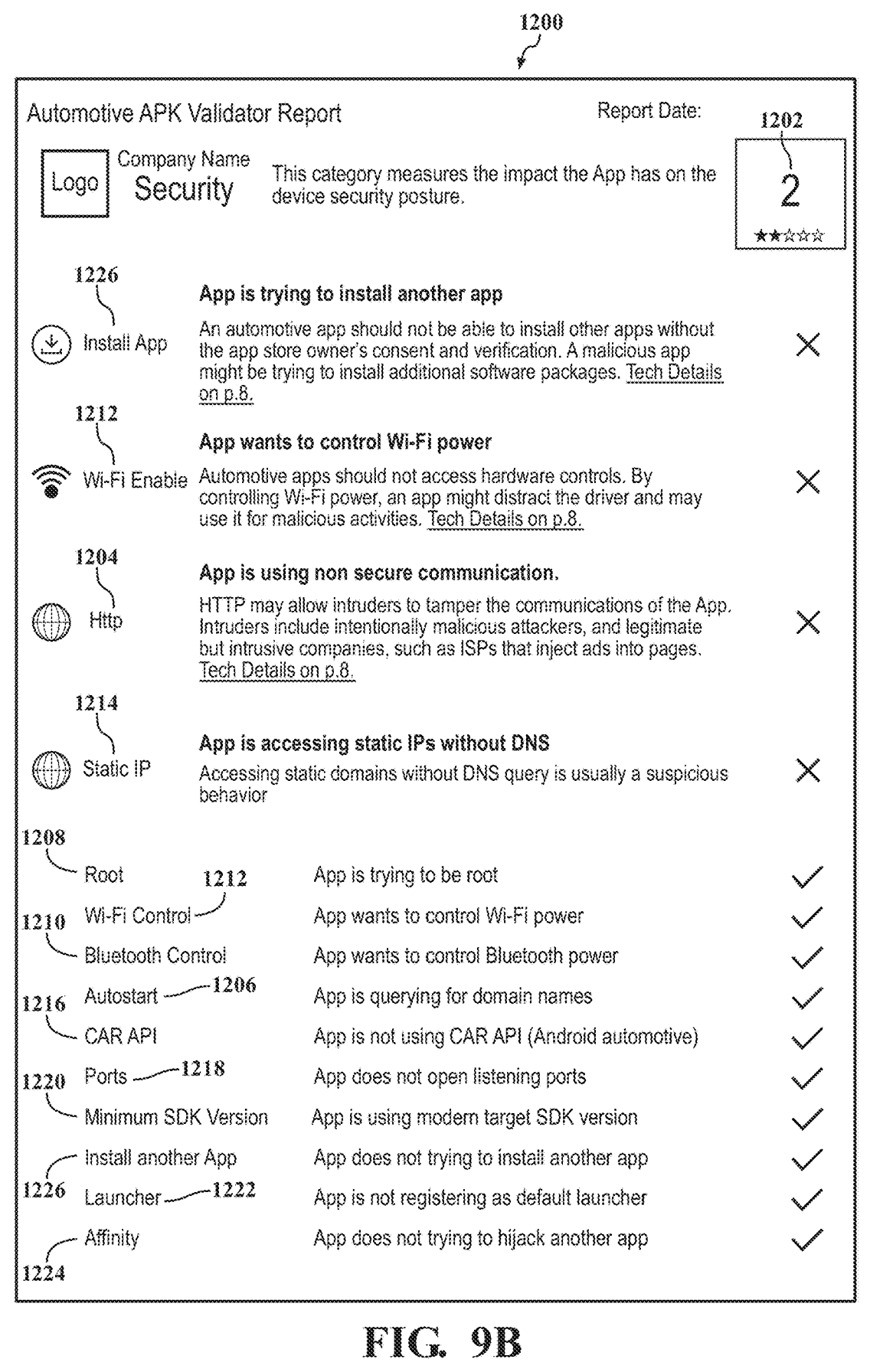

Automotive APK Validator Report                    Report Date:          1202

Logo | Company Name
       Security          This category measures the impact the App has on the device security posture.          2
★★☆☆☆

1226

App is trying to install another app

⊕ Install App          An automotive app should not be able to install other apps without the app store owner's consent and verification. A malicious app might be trying to install additional software packages. Tech Details on p.8.          ✕

1212

App wants to control Wi-Fi power

📶 Wi-Fi Enable          Automotive apps should not access hardware controls. By controlling Wi-Fi power, an app might distract the driver and may use it for malicious activities. Tech Details on p.8.          ✕

1204

App is using non secure communication.

🌐 Http          HTTP may allow intruders to tamper the communications of the App. Intruders include intentionally malicious attackers, and legitimate but intrusive companies, such as ISPs that inject ads into pages. Tech Details on p.8.          ✕

1214

App is accessing static IPs without DNS

🌐 Static IP          Accessing static domains without DNS query is usually a suspicious behavior          ✕

1208

Root          1212          App is trying to be root          ✓

1210     Wi-Fi Control          App wants to control Wi-Fi power          ✓

Bluetooth Control          App wants to control Bluetooth power          ✓

1216     Autostart ——1206          App is querying for domain names          ✓

CAR API          App is not using CAR API (Android automotive)          ✓

1220     Ports ——1218          App does not open listening ports          ✓

Minimum SDK Version          App is using modern target SDK version          ✓

Install another App          App does not trying to install another app          ✓

1226     Launcher——1222          App is not registering as default launcher          ✓

Affinity          App does not trying to hijack another app          ✓

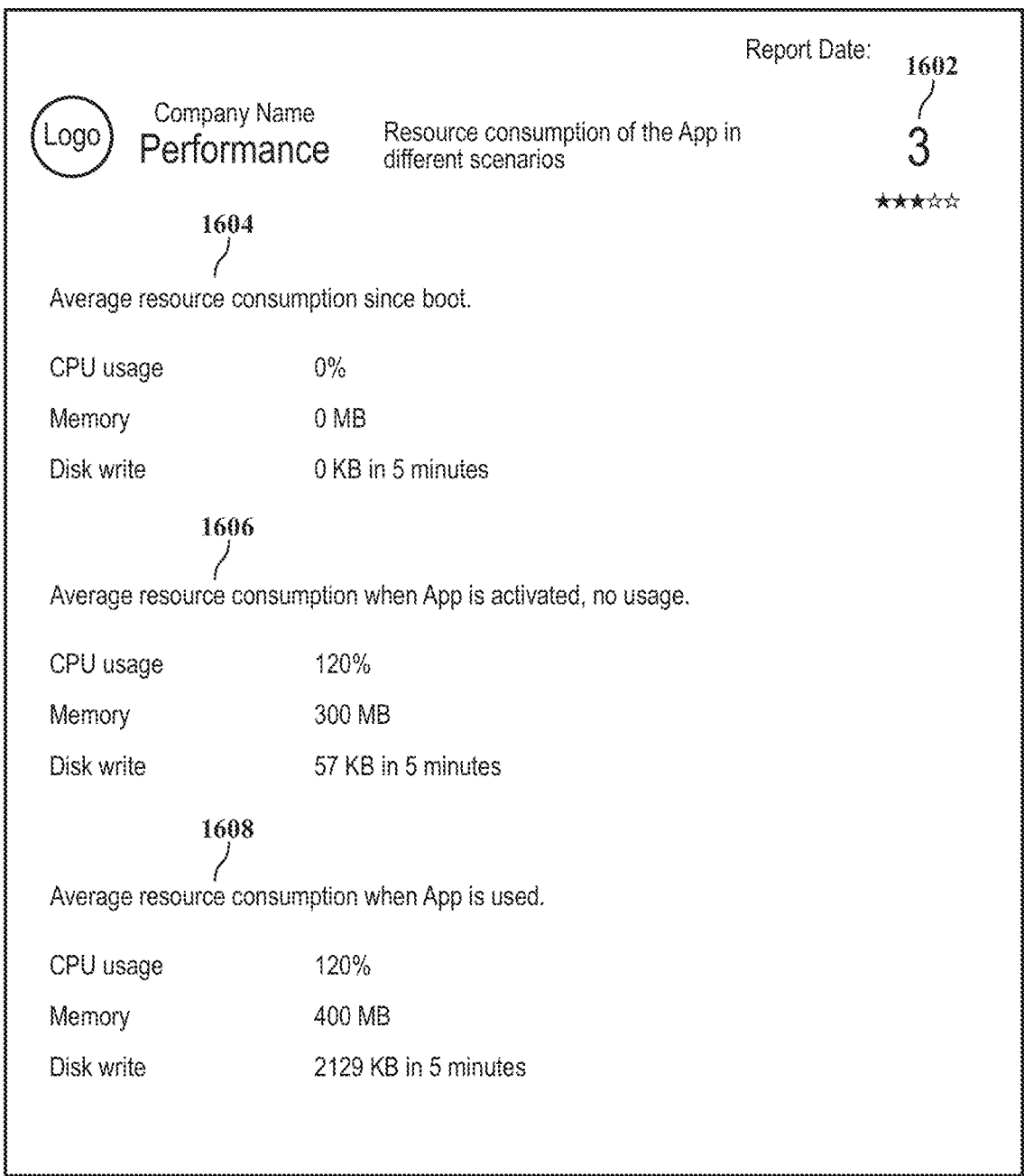

Report Date:          1602

Company Name          Resource consumption of the App in          3
Logo          Performance          different scenarios

★★★☆☆

1604

Average resource consumption since boot.

CPU usage          0%

Memory          0 MB

Disk write          0 KB in 5 minutes

1606

Average resource consumption when App is activated, no usage.

CPU usage          120%

Memory          300 MB

Disk write          57 KB in 5 minutes

1608

Average resource consumption when App is used.

CPU usage          120%

Memory          400 MB

Disk write          2129 KB in 5 minutes

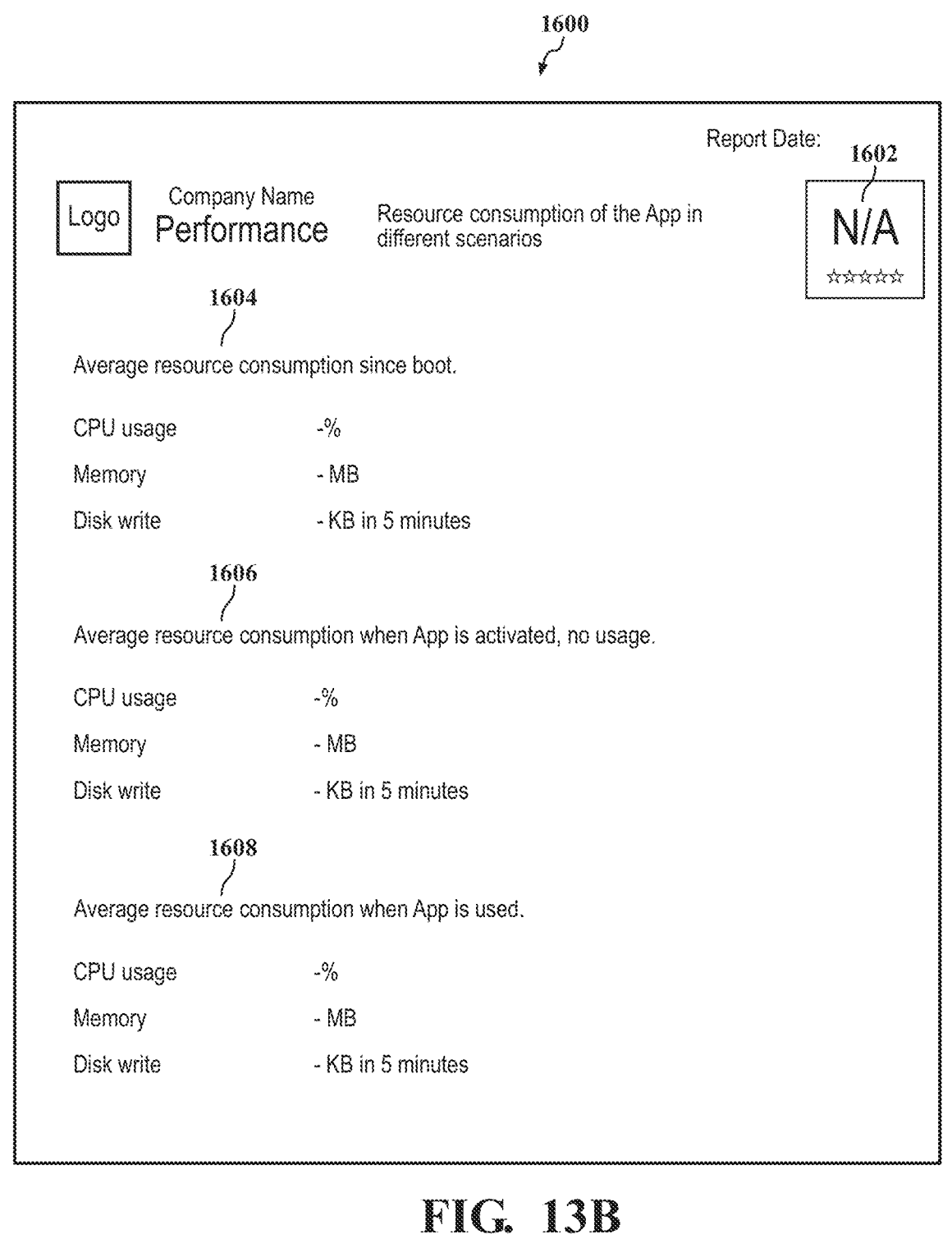

Report Date:        1602

Logo    Company Name
        Performance        Resource consumption of the App in
                        different scenarios        N/A

☆☆☆☆☆

1604

Average resource consumption since boot.

CPU usage            -%

Memory              - MB

Disk write            - KB in 5 minutes

1606

Average resource consumption when App is activated, no usage.

CPU usage            -%

Memory              - MB

Disk write            - KB in 5 minutes

1608

Average resource consumption when App is used.

CPU usage            -%

Memory              - MB

Disk write            - KB in 5 minutes

FIG. 13B

SYSTEM AND METHOD FOR APP CERTIFICATION

CROSS-REFERENCE

This application claims priority to provisional applications 63/295,352, 63/295,368, and 63/295,399, filed Dec. 30, 2021, the entirety of which are incorporated by reference herein.

TECHNICAL FIELD

The present disclosure relates to a system and method for certification of application software, also known as an App, using a web-based portal.

BACKGROUND

When developing Application software, hereinafter referred to as an App, a developer submits draft versions to an App provider, such as an App store, for provider certification before the App is made available (published) for purchase by a user. The provider may test the App and make recommendations for changes to be implemented by the developer. Upon receiving certification of the App version from the provider, the developer will publish the App, making it available for users to purchase through the provider. Typically, the process for a provider to certify an App version ahead of its publication by the developer may take several rounds of back and forth ahead of a final approval (certification) by the provider and, ultimately, publication of the App by the developer.

Vehicles may be equipped with technology that brings the capability of connecting the vehicle in a way that allows bidirectional communication with systems outside of the vehicle, such as internet access, cloud services, data sharing, etc. that is typically conducted on an in-vehicle infotainment unit thereby providing a means for a user to access a provider from the vehicle. An Original Equipment Manufacturer (OEM) of such a connected vehicle may present their own version of an App store, accessible from the vehicle, for users to access. The OEM may also provide Apps to a user by pre-installing an App in the vehicle. User may access Apps, whether free, offered for sale, or pre-installed, by way of the infotainment unit in the connected vehicle.

A vehicle-based App is an App that provides a user with capabilities to control basic operations of a vehicle. When multiple OEMs are offering a developer's App, particularly for Apps that are vehicle-based, each OEM will have their own requirements or restrictions for the App based on vehicle capabilities and limitations such as a country the vehicle will operate within, a make/model of the vehicle, a make/model of an infotainment unit, a CPU type, a level of Application Programming Interface (API), etc. Working with several OEMs to determine target attributes for so many different targets may become very cumbersome for the App developer. Similarly, it can be unnecessarily complicated for the OEM when the OEM is responsible for reviewing submissions from several different App developers.

There is a need for a mediate administrator to facilitate the submission and certification of an App submitted by an App developer to an OEM to ensure the App is supported by the OEM's existing technology within a vehicle.

SUMMARY

A system and method for a web-based portal for certification of an application software (App). A draft App is created and submitted, by an App developer, to the web-based portal where a mediate administrator reviews, approves, or rejects the draft App based on a set of target attributes that are set by an App provider. The mediate administrator communicates a rejection of the draft App to the developer with reasons for the rejection. The mediate administrator communicates approval of the draft App to the developer and to one or more providers. Communication of the approval to one or more providers may occur simultaneously. The one or more providers perform their own review of the App and may modify the approved App with further target attributes. The one or more providers may review, from the web-based portal, each approved draft App from a plurality of developers. An approved App is published by the developer. An approved and/or modified approved App may be offered by the provider to a user by way of an in-vehicle infotainment system.

DESCRIPTION OF DRAWINGS

FIG. 2B is a screen shot of a landing page for a mediate administrator or a provider/OEM;

FIG. 5 is a flow diagram of the OEM role;

FIG. 6 is a block diagram of a validation engine;

FIG. 8A is an example report for analysis of acceptability of an App to be used in a vehicle;

FIG. 8B is an example report for analysis of acceptability of an App to be used in a vehicle;

FIG. 9A is an example report for analysis of a security of an App to be used in a vehicle;

Figure 10A:
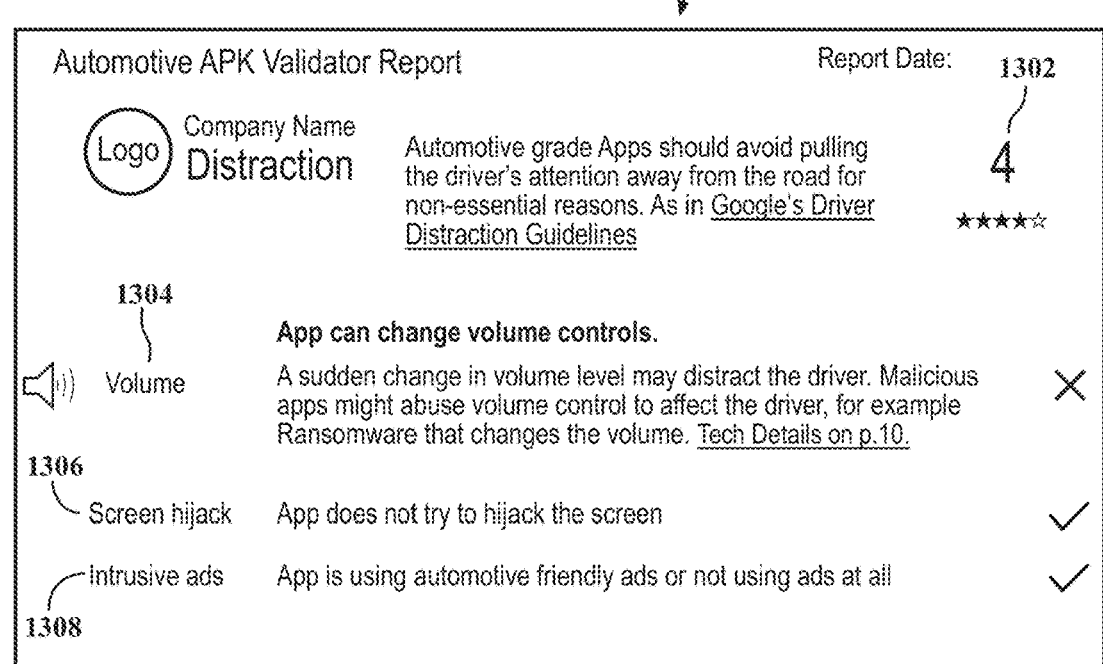
Figure 10B:
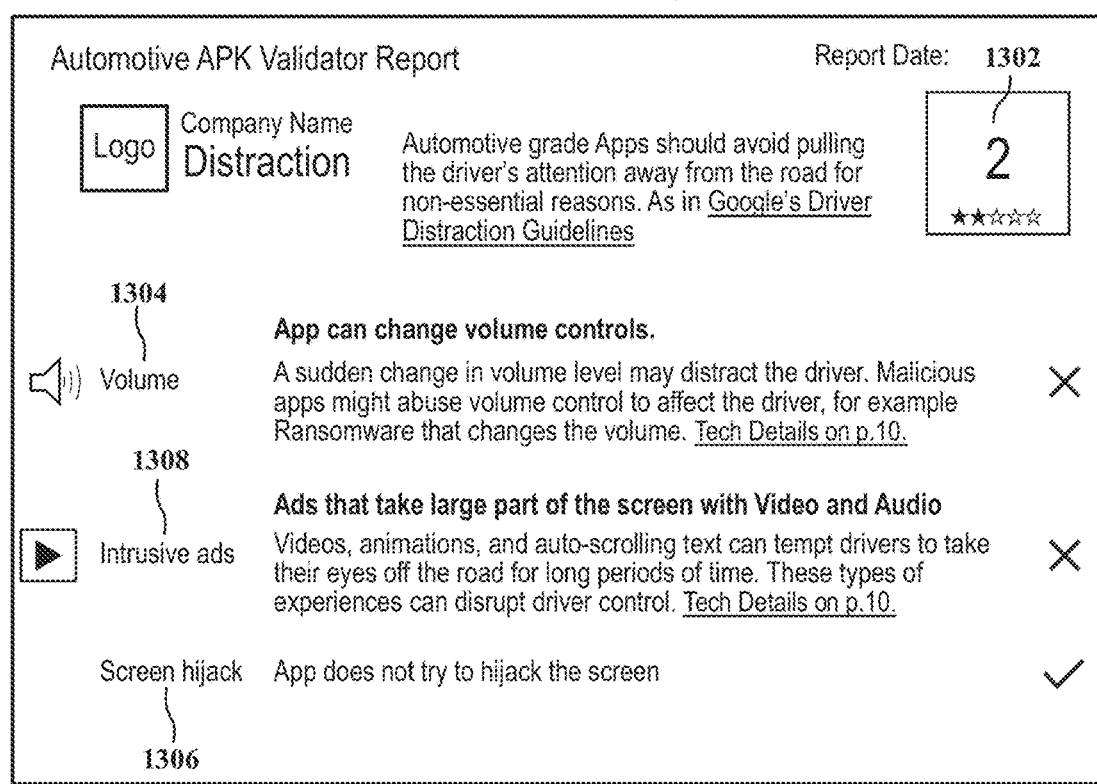
Figure 11A:
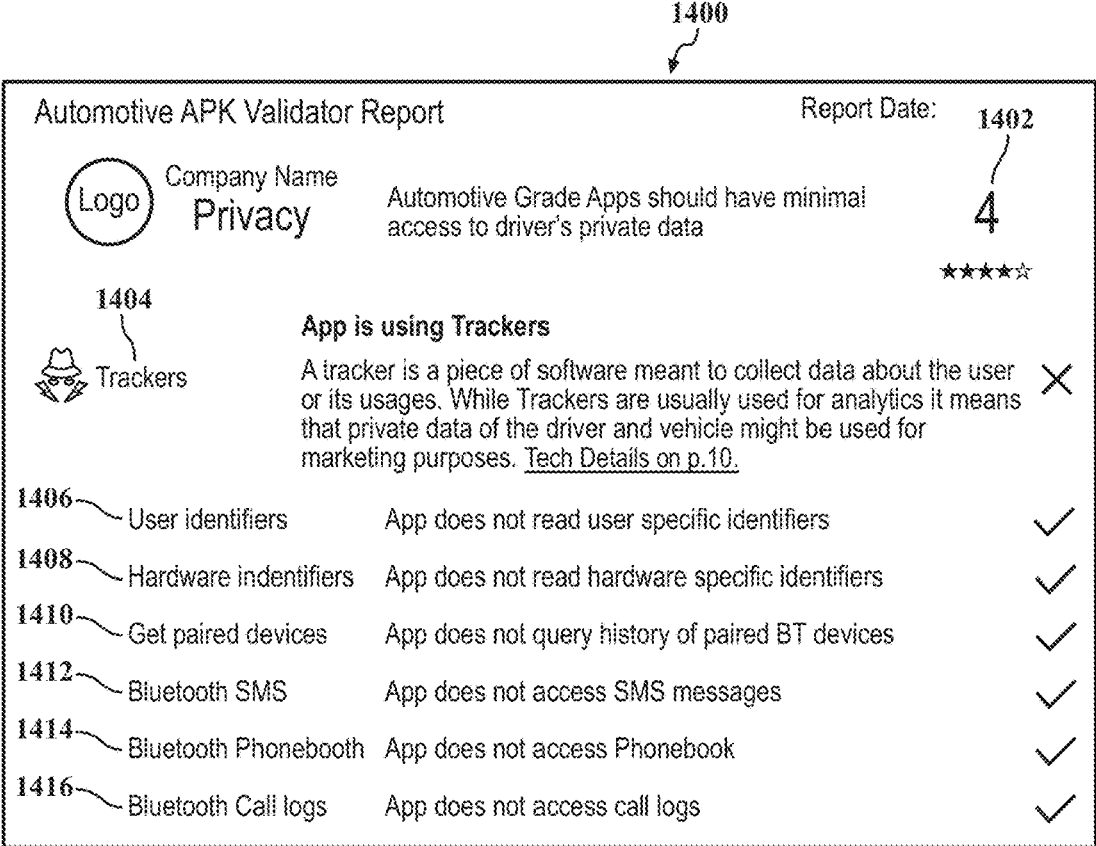
Figure 11B:
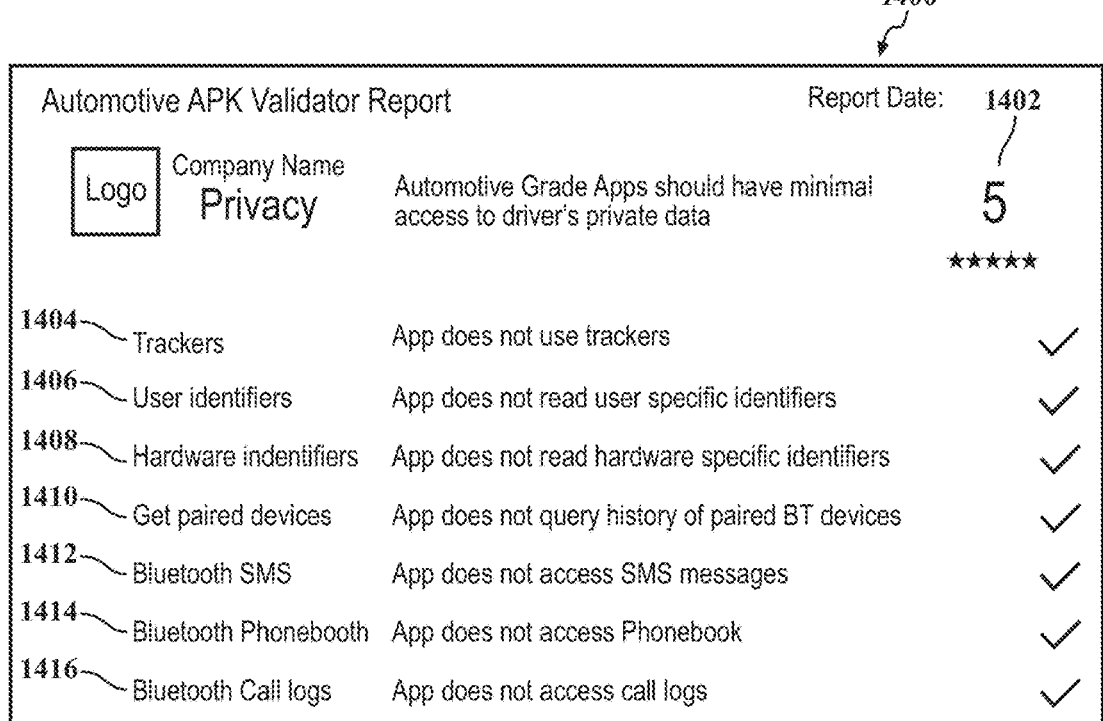
Figure 12A:
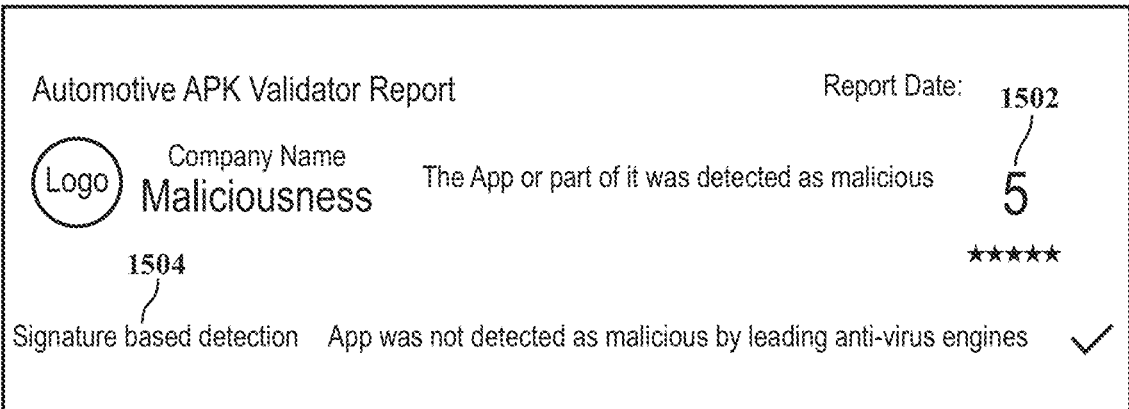
Figure 12B:
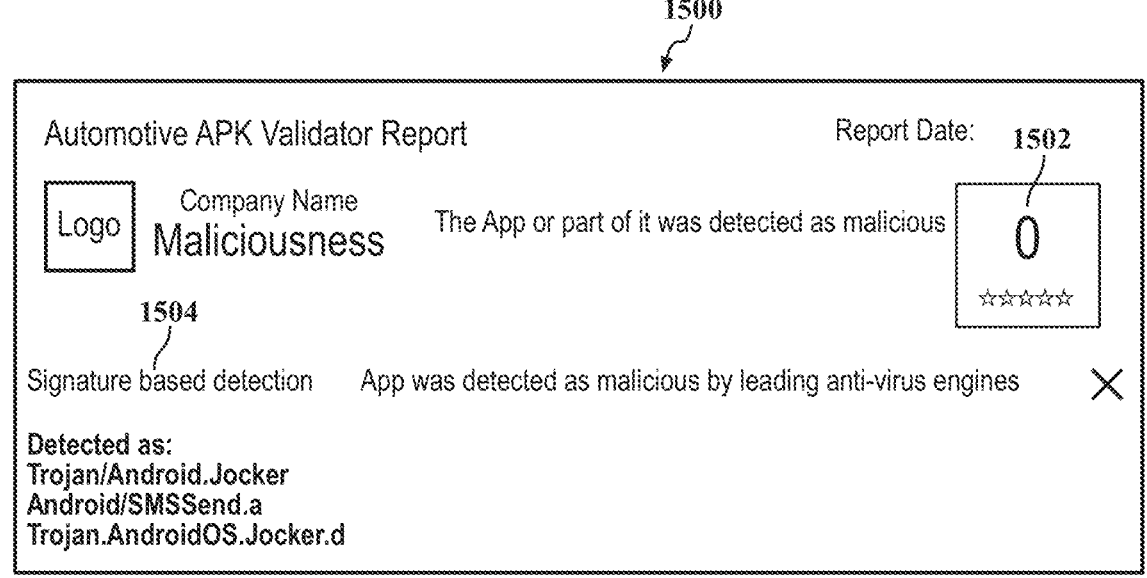
Figure 14:
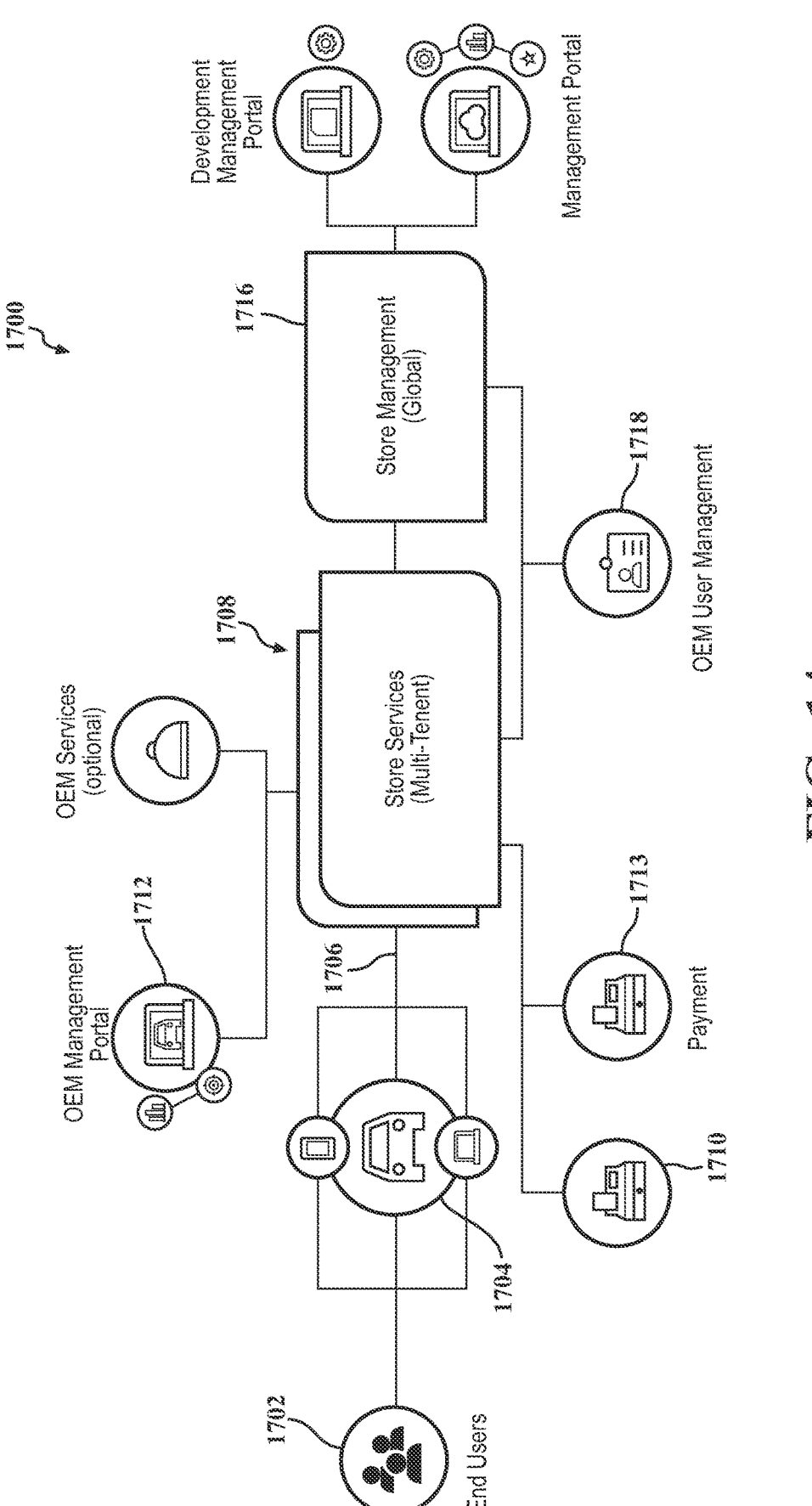
Figure 15:
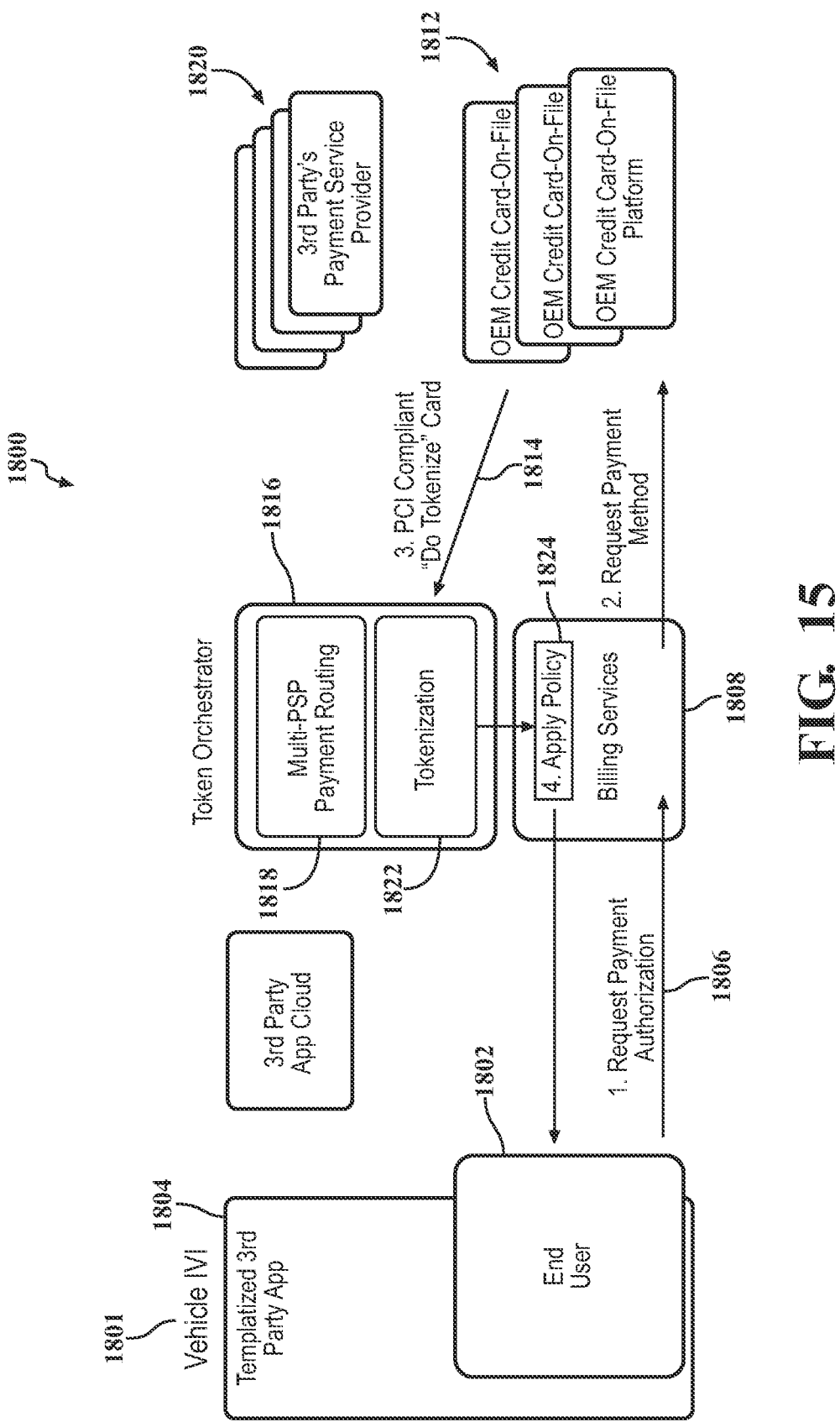
Figure 16:
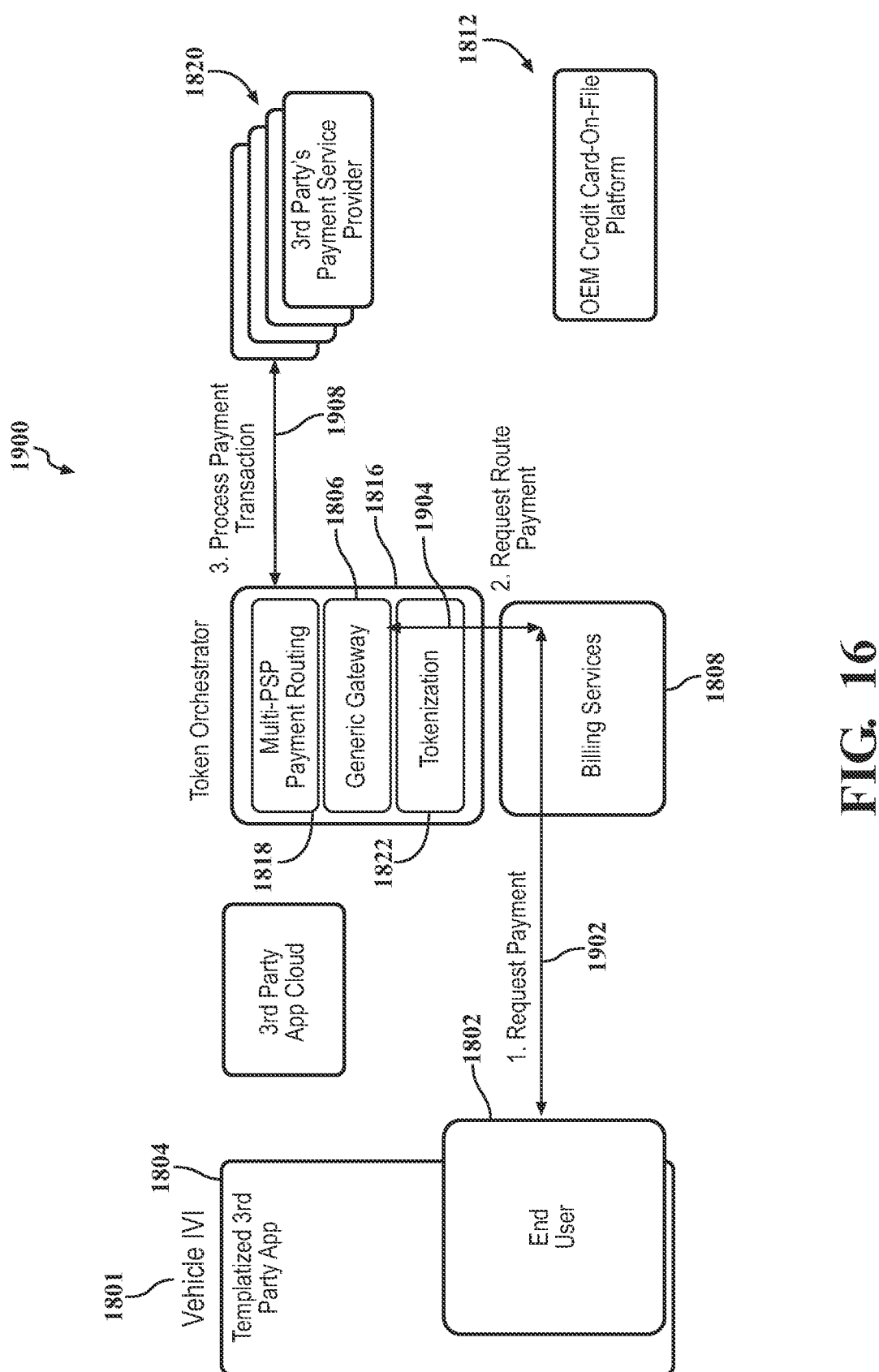
Figure 17:
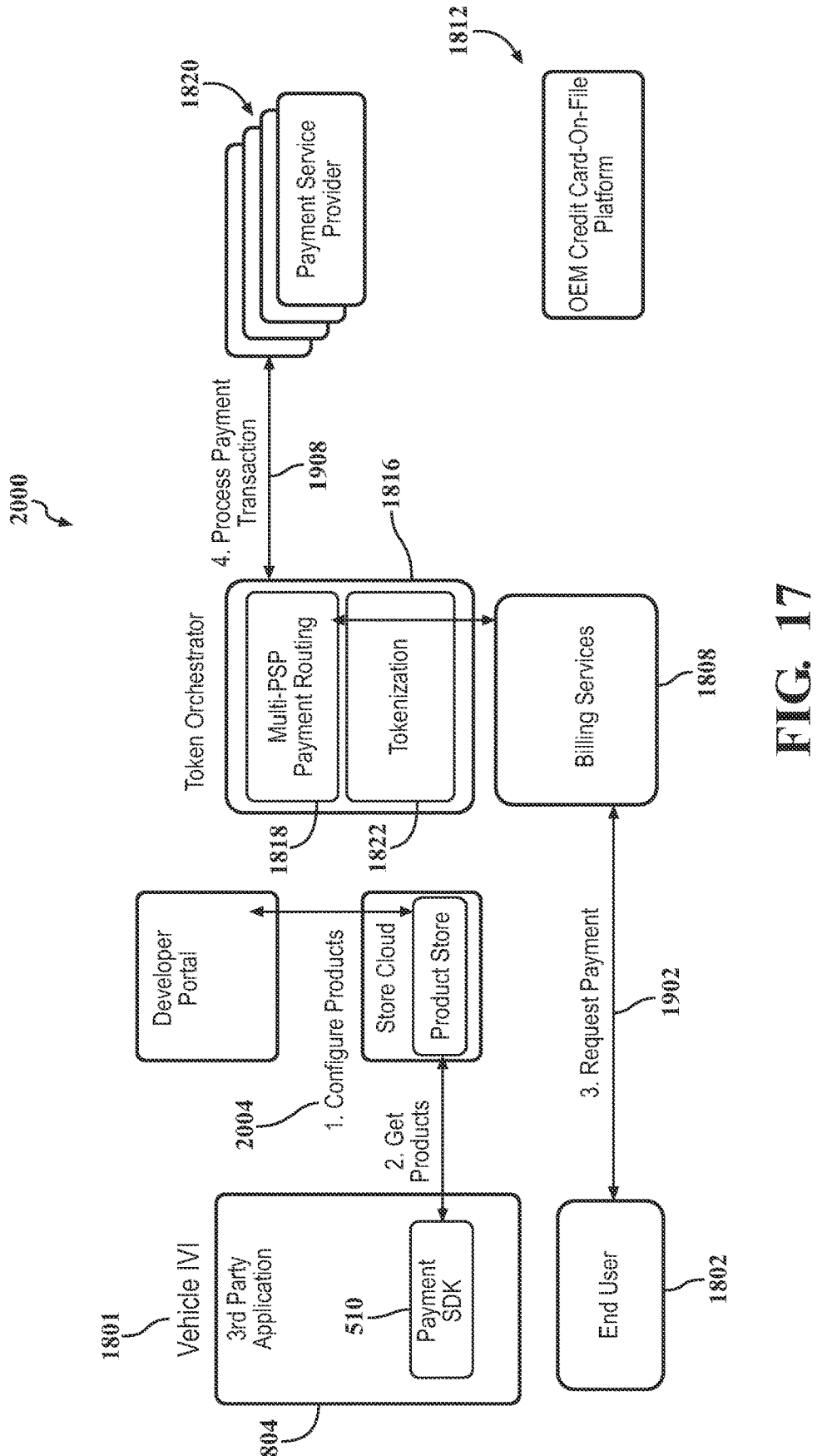
Figure 18:
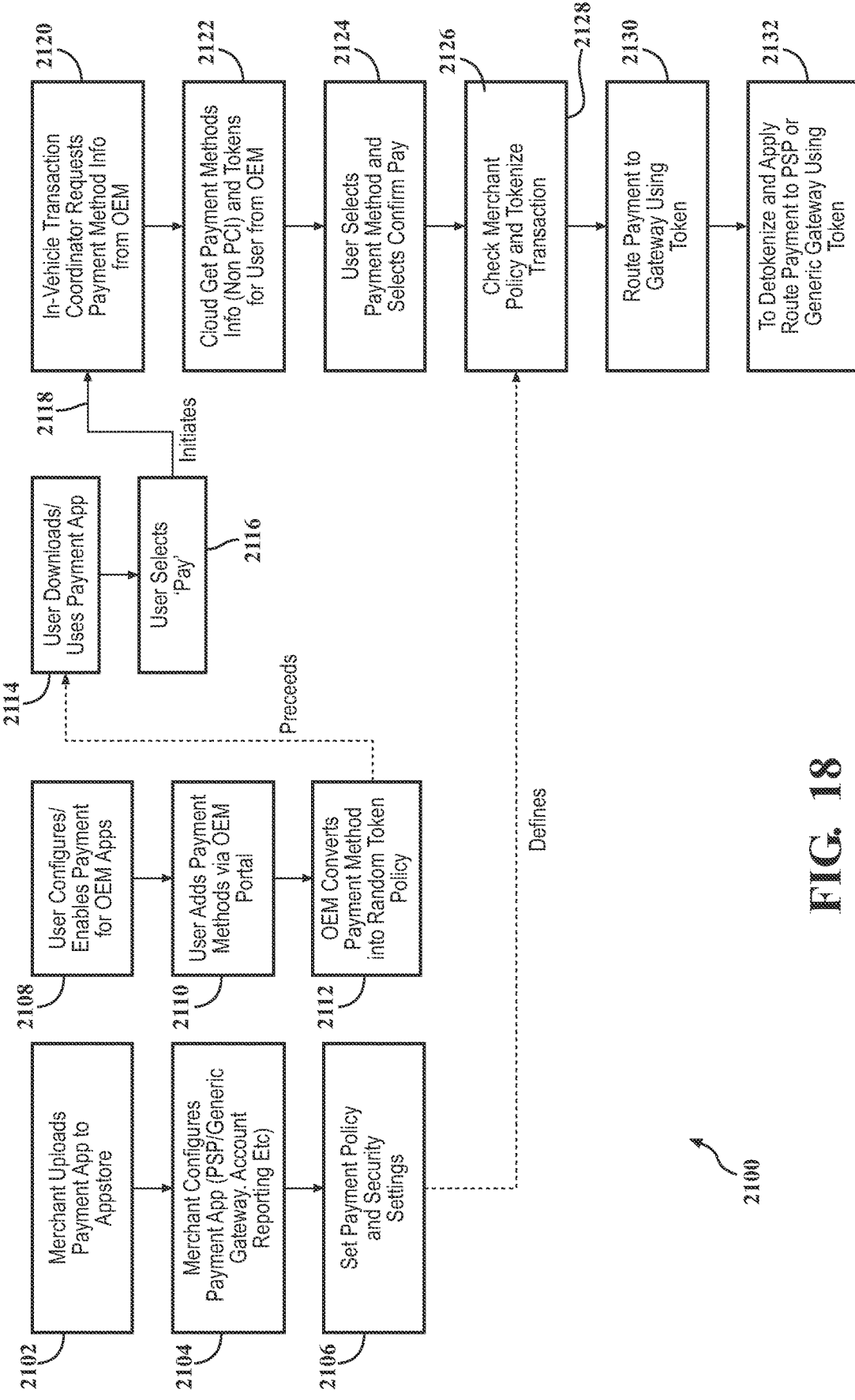

FIB. 9B is an example report for analysis of a security of an App to be used in a vehicle;

FIG. 10A is an example report for analysis of distraction of an App to be used in a vehicle;

FIG. 10B is an example report for analysis of distraction of an App to be used in a vehicle;

FIG. 11A is an example report for analysis of privacy of an App to be used in a vehicle;

FIG. 11B is an example report for analysis of privacy of an App to be used in a vehicle;

FIG. 12A is an example report for analysis of maliciousness of an App to be used in a vehicle;

FIG. 12B is an example report for analysis of maliciousness of an App to be used in a vehicle;

FIG. 13A is an example report for analysis of performance of an App to be used in a vehicle; and FIG. 13B is an example report for analysis of performance of an App to be used in a vehicle.

Elements and steps in the figures are illustrated for simplicity and clarity and have not necessarily been rendered according to any sequence. For example, steps that may be performed concurrently or in different order are illustrated in the figures to help to improve understanding of embodiments of the present disclosure.

DETAILED DESCRIPTION

While various aspects of the present disclosure are described with reference to a system and method for certification of an App, the present disclosure is not limited to such embodiments, and additional modifications, applications, and embodiments may be implemented without departing from the present disclosure. In the figures, like reference numbers will be used to illustrate the same components. Those skilled in the art will recognize that the various components set forth herein may be altered without varying from the scope of the present disclosure.

Figure 1:
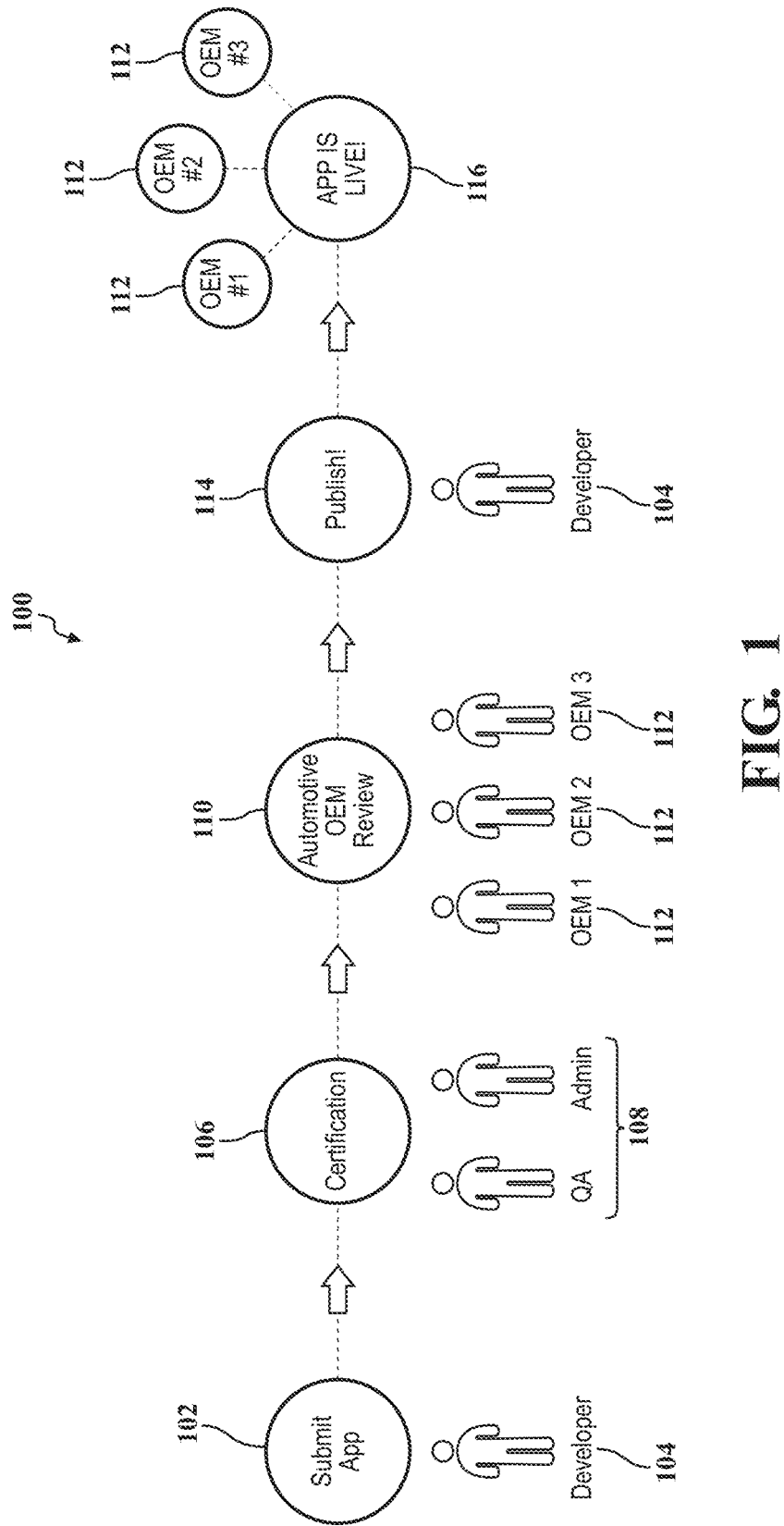
FIG. 1. is a block diagram of the overall flow of submission, certification, and publication of an App.

FIG. 1 is a diagram 100 showing the course of action an App takes within a web-based portal managed by a mediate administrator 108. An App developer 104 designs, creates, deploys, and updates custom software programs that are made available, through download or purchase and download, to the public by providers 112. In the general description hereinafter, the providers 112 that make Apps accessible are automotive OEMs, offering Apps created by App developers 104, to the public. The Apps may be used in a vehicle-based system and may be purchased, downloaded, or otherwise accessed from an infotainment system in a vehicle. There are three major participants in the process, the developer 104, the mediate administrator 108 and the OEM 112. The process of developing and ultimately releasing 116 the App is overhauled by the inventive subject matter to streamline the process for both the App developer 104 and the OEM 112.

The App undergoes a process from its creation that includes submission 102 by the developer 104, certification 106 by the mediate administrator 108, review 110 by one, or more, providers 112, hereinafter also referred to as an automotive OEM, or OEM, 112, to its publication 114 by the App developer 104, and ultimately to release 116 of a live version of the App publicly accessible to the public via a platform supported by multiple OEM's 112.

The unique nature of an App that is accessible from a vehicle introduces a variety of concerns that the developer 104 may not be immediately aware of, such as driver distraction, safety, privacy, to name just a few: And from a standpoint of the OEM 112 providing the Apps to the public, there may be numerous Apps and developers 104 submitting their Apps to the OEM 112. The role of the mediate administrator 108 in the inventive subject matter simplifies the process for each developer 104 and each OEM 112 by collectively handling the details of certification after the App has been submitted by the developer 104. The details include, but are not limited to, quality assurance and testing to make sure the App is suitable for use in a vehicle and to make sure the App meets the target standards set by each OEM 112.

Communications that would normally occur between the developer 104 and the OEM 112 are handled, in confidence, through the mediate administrator 108. In this process, the mediate administrator 108 is knowledgeable of requirements from each OEM 112 and handles the developer 104 so that the developer may develop an App that meets each OEM's 112 specifications, and particularly specifications that are necessary for use of the App in a vehicle. The knowledge base that the mediate administrator 108 has for each OEM allows the mediate administrator to handle a plurality of developers 104 and a plurality of OEMs 112, easing the burden on developers 104 from having to sift through all the particulars of each OEM and easing the burden on the OEMs 112 from having to handle communications with each developer 104.

A benefit the mediate administrator 108 provides to the developer 104 is that the developer's App, once published, may be offered by multiple OEMs 112 at the same time. Similarly, the OEM 112 is spared the necessity of handling a plurality of drafts for App submissions individually with multiple developers. The mediate administrator 108 pre-screens draft Apps to make sure the App is meeting targets and specifications required by the OEM. Without the mediate administrator 108, each OEM 112 would be tasked with handling each App submission from its very early stages on an individual basis. The mediate administrator 108, acting as an intermediary, handles a multitude of behind-the-scenes steps that need to take place from the time the draft App is submitted 102 until it is approved and becomes accessible by a user from within the vehicle.

Figure 2A:
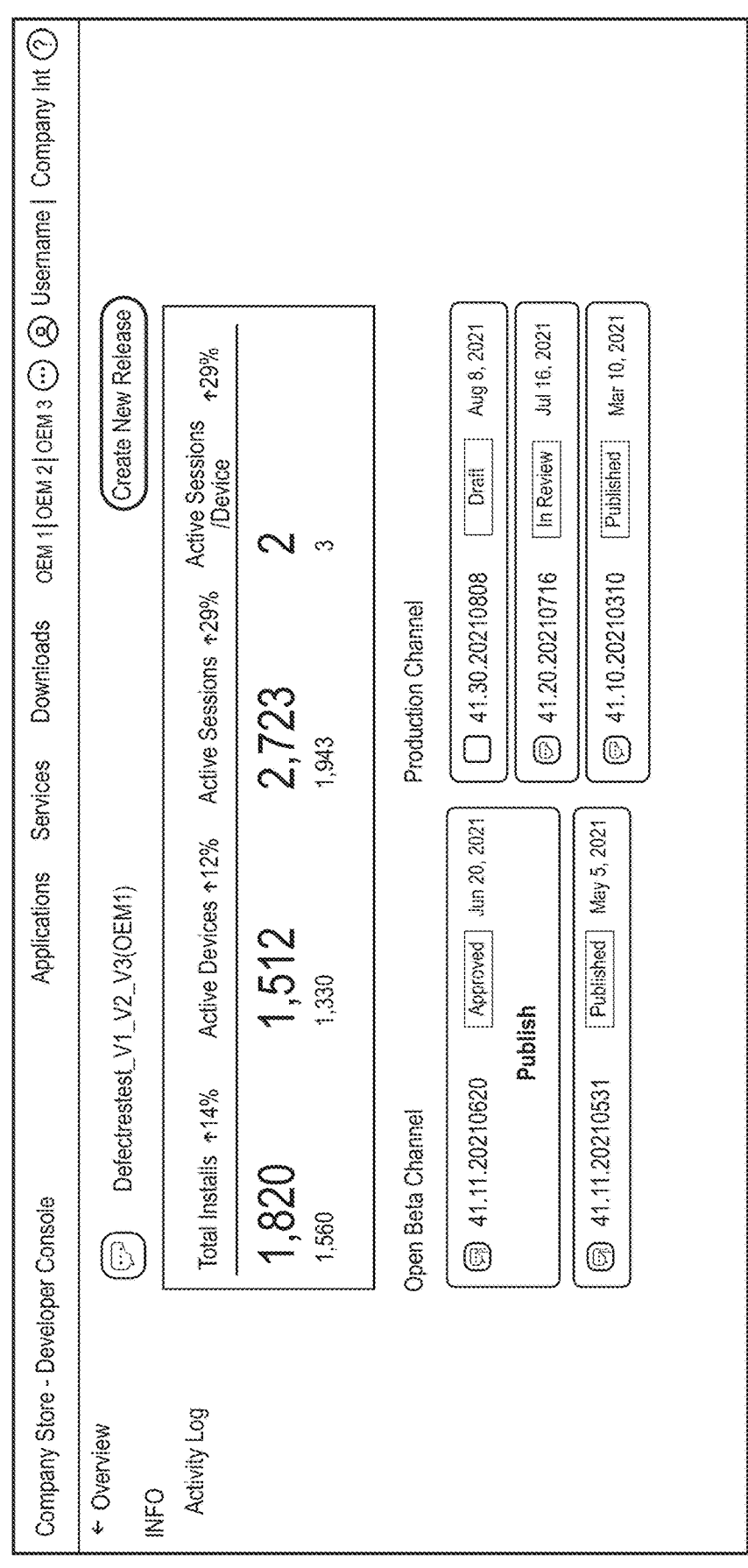
FIG. 2A is a screen shot of a landing page for a developer.

FIG. 2A is a screen shot of an example landing page for a developer. Once a developer is onboarded and able to access a web-based portal, draft Apps will be created and submitted from the web-based portal. The landing page provides a way for the developer to navigate the portal. An Activity log allows the developer to view activity related to their submitted Apps including, but not limited to releases, approvals, draft Apps pending, draft Apps in review, draft Apps published, etc.

FIG. 2B is a screen shot of an example landing page for a mediate administrator. A similar landing page is available for a provider. The landing pages are similar because each of the mediate administrator and the provider perform similar reviews of draft Apps submitted by the developer. For simplicity, only the mediate administrator landing page is shown. The landing page shown in FIG. 2B provides a summary of draft Apps that have been submitted by one or more developers. A summary of a number of draft Apps that are in progress and their status, such as "Submitted". "In Certification". "Final Review". "Approved". "Published". "Deleted" may be found. A list of "Submitted" Apps is shown in FIG. 2B and may be organized or listed by name of the App, a company name of the developer (identified as Publisher in FIG. 2B), an identification of the version in review, a date that App is submitted. Also shown is a name of the reviewer of the App that is responsible for analyzing and reviewing the App (to be described in detail later herein).

Figure 2C:
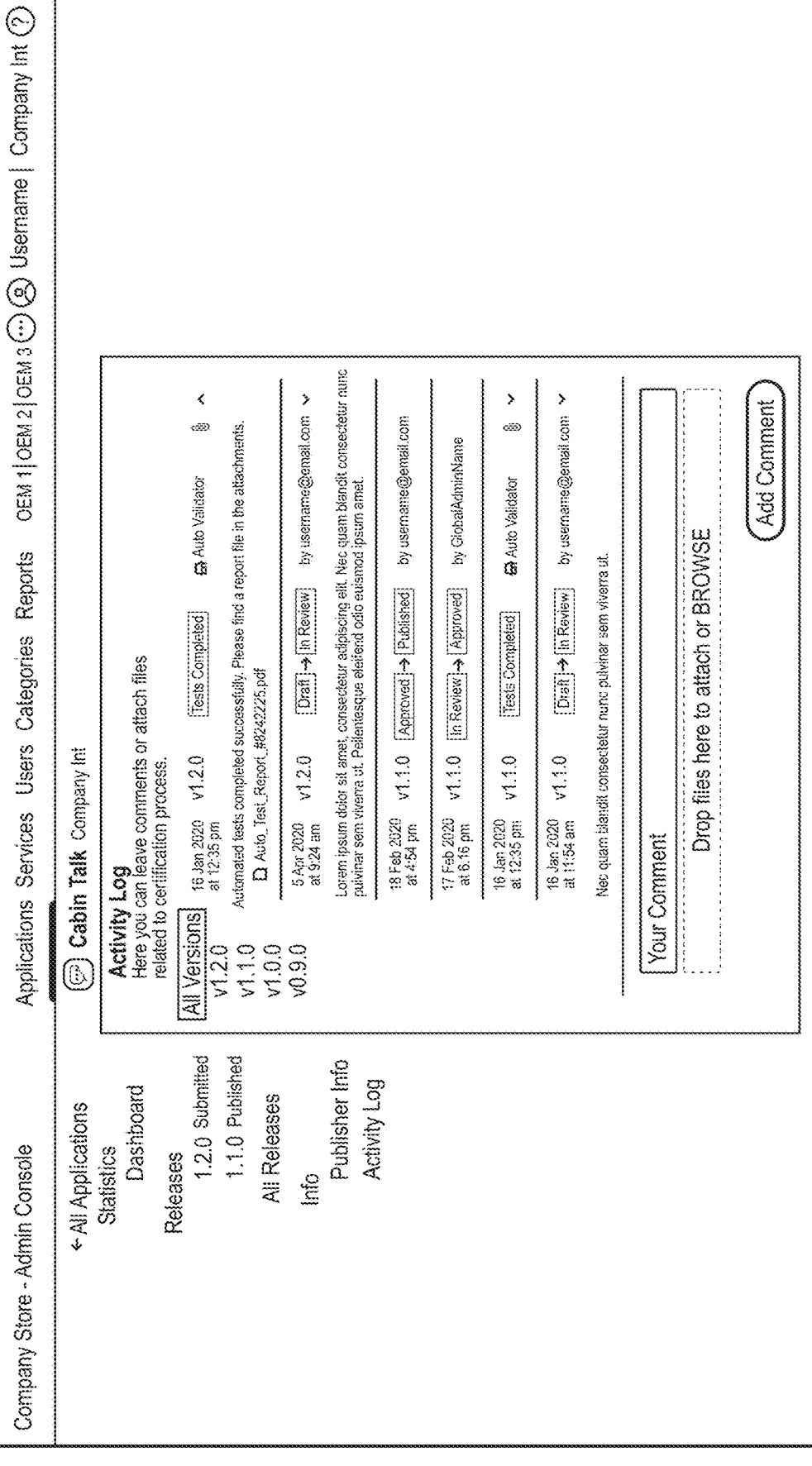
FIG. 2C is a screen shot of a landing page for comments from the mediate administrator to the developer.

FIG. 2C is a screen shot of an example landing page for the mediate administrator to view a status for one of the Apps under review. In the example shown in FIG. 2C, the status includes an Activity Log where each version is listed. The mediate administrator is able to leave comments and/or attach files related to certification of a draft App submission.

Figure 3:
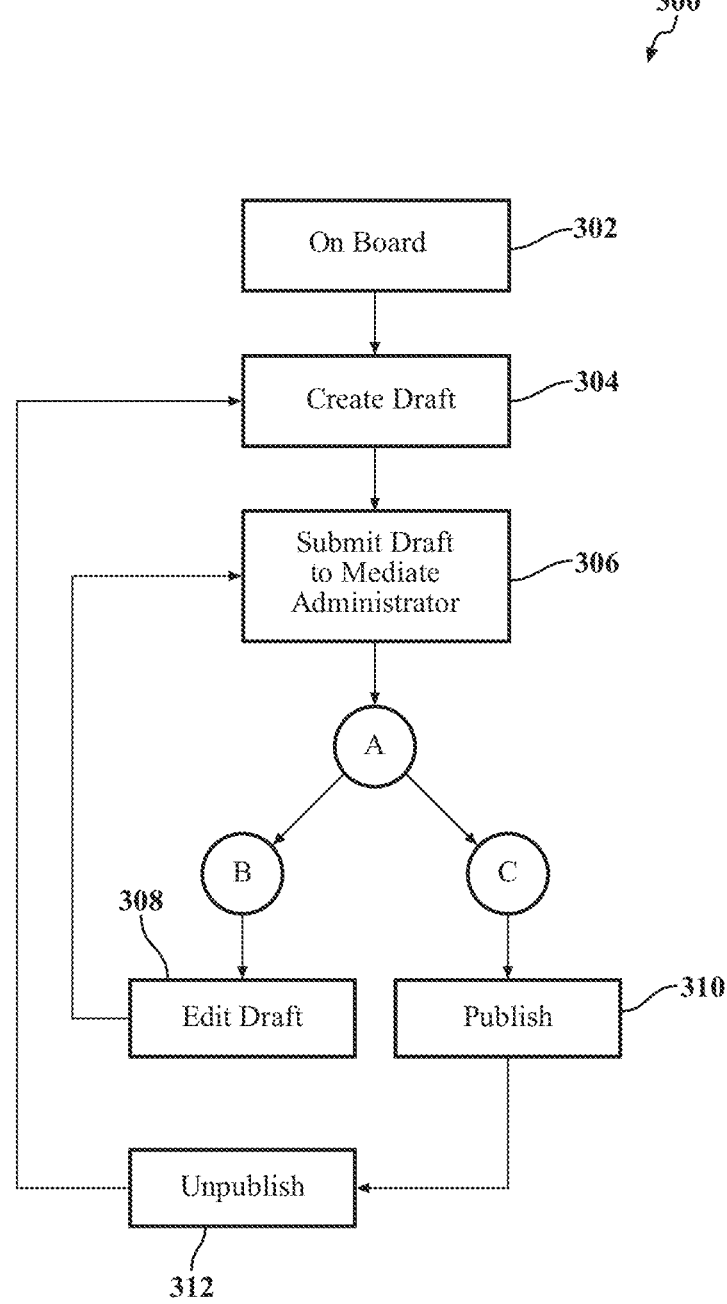
FIG. 3 is a flow diagram of the developer role.

FIG. 3 is a diagram 300 of the role of the developer 104 in the process. The developer 104 onboards 302 with the mediate administrator 108. Onboarding may take place by way of a web-based portal through which the developer 104 applies for, or is invited, access a system for submission and certification of an App for an OEM to provide use (or purchase) of the App from within a vehicle by a user in the vehicle.

Once the developer 104 is onboarded, access to the portal is granted by the mediate administrator 108, the developer 104 has access to the landing page (see FIG. 2A) that provides links to tools and guidelines the developer 104 needed to develop a draft of the App in accordance with targeting attributes set by the provider 112. The targeting attributes that come from OEMs 112 may be unique to a particular OEM 112, they may be set by a specific country, and/or they may be set by a particular type of central processing unit or operating system. The draft App will typically be designed around targeting attributes 120. Some attributes may be known by the developer. For example, metadata, OS versions, etc. However, some attributes may be specific to a particular OEM. For example, the vehicle make/model, vehicle features, and vehicle processing capabilities, countries.

The attributes for all of the OEMs, all of the countries, and all of the CPUs/Oss are known by the mediate administrator 108 and are presented, via the portal, to the developer 104 so that the developer can select which OEMs, which makes/models, which countries will be applicable to their App and therefore have immediate access to the targeting attributes necessary for their design of the App without the back-and-forth communication that would be required when the developer 104 would have to communicate directly with each OEM 112, country, etc.

As discussed above, the targeting attributes may be limited by technical features (i.e., CPU Architecture, OS version, feature availability) or commercial features (i.e., specific Car Makes. Model Years). For example, a developer 102 may allow an App to run only on a specific manufacturer's vehicles, only on vehicles that have a driver facing camera, or streaming video on an infotainment display unit. Some restrictions may come from the application itself. For example, the application contains metadata that states, for example, that it requires an OS version such as Android 10 or later. For vehicles or OS versions that are limited by the targeting attributes, the mediate administrator 104 restricts the ability for a user to see and download Apps that are not compatible and cannot be used on the vehicle.

Figure 4:
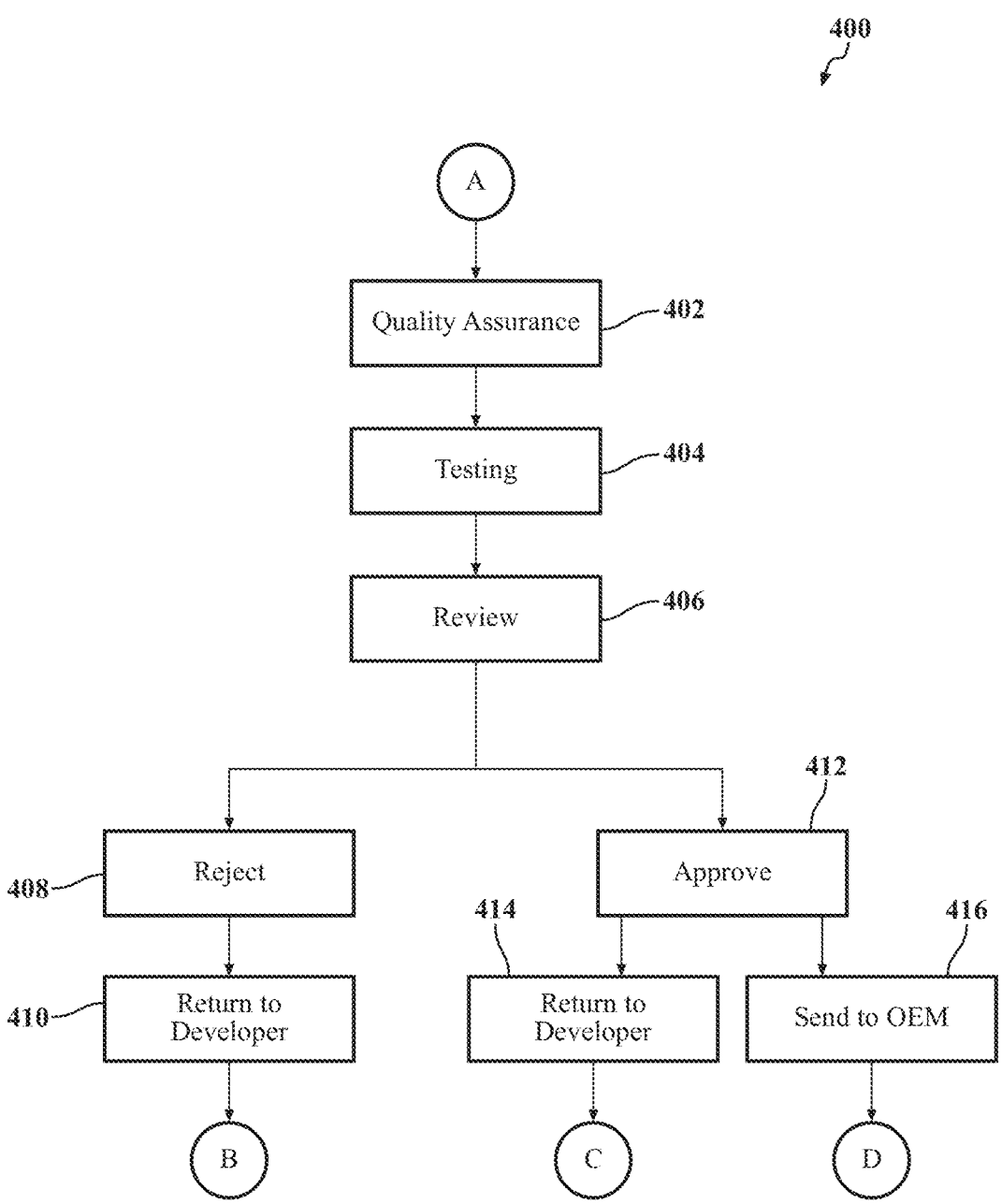
FIG. 4 is a flow diagram of the mediate administrator role.

Once the developer 102 has completed the draft App, the draft App is submitted 306, via the portal, to the mediate administrator 108 to begin a certification process, which is carried out by the mediate administrator 108, see point A in FIGS. 3 and 4. FIG. 4 is a diagram 400 of the role of the mediate administrator in the certification process.

The App draft submitted by the developer 104 undergoes a certification process, during which the App draft is put through a series of steps and tests that allow the mediate administrator 108 to evaluate the draft App and ensure it meets the target attributes required by the provider. The certification process may include quality assurance 402. Quality assurance 402 may include, but is not limited to, bench tests that evaluate the App draft for factors associated the App draft's functionality a head unit for each OEM, such as, but not limited to, screen size, screen orientation, SSD capacity, OS version, and CPU/chipset.

Other examples of testing 404 may include automated testing tailored to evaluate interoperability, objectionable content, a level of information collected, system permission access, a stability of the App's performance, and a responsiveness of the App's performance. The tests described herein are examples, the entirely of which are too numerous to mention. The testing and evaluation may be performed for example, by the following system and method.

In one example, a validation engine determines if an App is appropriate for use in a vehicle. FIG. 6 is a block diagram of a validation engine 600 to determine is use of an App is appropriate for an in-vehicle setting. For example, if it is appropriate for a driver to use the App from an in-vehicle infotainment, and particularly, while the vehicle is being driven. The validation engine 600 performs several tests on the App, analyzes the results and issues a determination about what effect using the App if it is used in a vehicle.

The validation engine 600 may determine whether an App poses a distraction to a driver. The validation engine may determine whether the App, or any portion of it, is malicious in nature. The validation engine 600 may determine whether the App poses a cybersecurity risk to the vehicle. The validation engine 600 may determine whether the App might compromise a user's private information. The validation engine 600 may also determine how the App may affect a performance of the device running the App, for example, processor usage, memory use, flash wear, etc., of the infotainment unit.

To accomplish this, the validation engine 600 performs a static analysis, a dynamic analysis, and an external analysis of the App. The analyses are aggregated, categories are scored, and a report detailing how the App may affect the performance of the device running the App is issued.

The static analysis is performed by a static validator 602. The static validator 602 executes a static analysis of decompiled code 604 and native libraries 606 associated with the App. The static analysis includes, but is not limited to, code extraction, reverse engineering and performing a permission check.

The dynamic analysis is performed by a dynamic validator 702. The dynamic validator 202 executes an analysis of hooks 704 in the App, executes an analysis of performance 706 of the App, and executes an analysis of data logs 708. The dynamic analysis includes, but is not limited to, sandbox emulation, traffic capturing, and resource usage monitoring.

Hooks 704 in an app are data and executable commands sent from one App to another over HTTP. Hooks 704 are functions that augment, or alter, behavior of the App or an operating system. Typically hooks are used for debugging and extending functionality. However, hooks may also be used by malicious code to adversely affect the output of an application programming interface. The analysis of hooks 704 will determine the purpose of hooking in the App.

Analysis of data logs 708 may identify suspicious events or threats to sensitive data. Analysis of data logs searches data and identifies abnormalities that might cause a problem. Examples of abnormalities may include error codes, login issues such as unauthorized logins or password changes, threats from sources outside a vehicle network, data exportation, any changes to filenames, etc.

An external validator 802 executes a malicious scan 804 and an open-source scan 806. The malicious scan 804 is performed on source code and flags malicious links, malware, etc. The open-source scan 806 may include, but is not limited to, scanning open-source software to determine common vulnerabilities and exposures (CVEs), usage of old libraries, license compliance of open-source components.

A decision maker 902 aggregates 904 the results of the static validator 602, the dynamic validator 702, and the external validator 802 to determine a score for each category being evaluated. In the present example, five categories are being evaluated for validation as to whether an App is adequate for use in a vehicle. The categories may include, but are not limited to, privacy, performance, distraction, security, and maliciousness. The decision maker 902 applies a score 906 to each category and executes a final report 908 of a decision stage. The final report summarizes the App, the scores, and the results of the analysis. The final report is prepared by an analyst (not shown in FIG. 6).

The score 908 is determined and assigned for each category of privacy, performance, distraction, security, and maliciousness. The score is assigned based on the aggregate results for each category. Using each score, an overall automotive grade score is assigned. The overall automotive grade score is an average of the scores from each category.

A report is generated. The report identifies and summarizes the App and outlines the results of the analysis of each category and may include technical details that were used by the validation engine.

Figure 7:
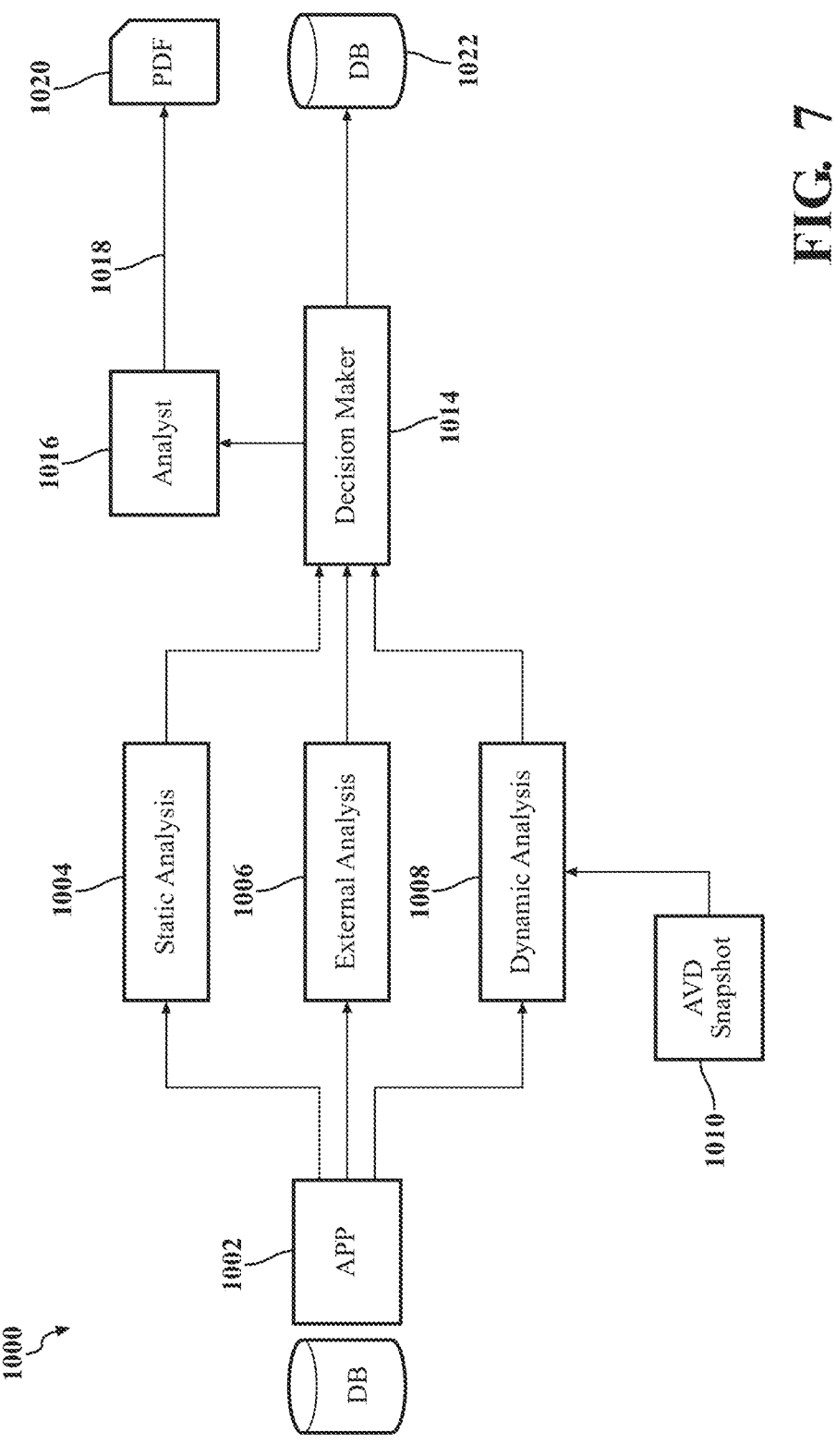
FIG. 7 is a flow diagram of a method for validation.

FIG. 7 is a flow chart of a method 1000 carried out by the validation engine of FIG. 6. One or more application software packages, hereinafter App, may be stored in a backend database. An App is submitted 1002 for certification. Three validators execute analysis that may run in parallel. The static validator executes 1004 the static analysis and the external validator executes 1006 the external analysis. The static analysis and the external analysis may begin as soon as the App is submitted 1002.

The dynamic validator begins to execute 1008 the dynamic analysis after a virtual device snapshot is taken 1010 and submitted 1012 to the dynamic validator. A virtual device is a configuration that defines the characteristics of a device, tablet, or automotive device, that is being simulated for analysis by the dynamic validator. A snapshot is a stored image of the virtual device that preserves the entire state of the device at the time it was saved.

When all three stages of validation 1004, 1006, and 1008 are executed completely, the decision maker executes a decision 1014 for each category. Upon completion of the decision 1014, an analyst receives 1016 a notification. The analyst creates 1018 a final report 1020. A database, such as a universal artifact repository, stores 522 the decision output by the decision maker.

Example reports are shown in FIGS. 8A through 13B. FIGS. 8A, 9A, 10A, 11A, 12A and 13A are example reports for an App that has a score indicating it may be acceptable for in-vehicle use. FIGS. 8B, 9B, 10B, 11B, 12B and 13B are example reports for an App that has a score indicating it may be unacceptable for in-vehicle use.

FIGS. 8A and 8B are examples of an overview 1100 of the analyses performed by the validators 602, 702, 802. The report may include a summary 1102 of the App. The summary may include the name 1102*a*, logo 1102*b*, description 1102*c*, subject matter 1102*d*, and version 1102*e*, with date, of the App that is the subject of validation. An overall automotive grade score 1104 is also displayed. This is the average of the scores assigned to each category. An Analyst Summary 1106 may be provided to give a brief description of the categories that may or may not be automotive compatible. For example, in FIG. 8A, the privacy and driver distraction categories are considered automotive compatible, while the performance of the App may not be suitable for an in-vehicle infotainment system. Any failed tests 1108 may be identified. In the example in FIG. 8B, the overall score 1104 is zero, out of five possible stars. This may indicate that the App may not be suitable for an in-vehicle infotainment system. Failed tests 1108 are identified.

Each category may also be addressed individually in the report. FIGS. 9A and 9B are examples of the analysis 1200 of security of two Apps. The analysis of the security measures an impact the App has on the device security posture, the device being an in-vehicle infotainment unit. A score 1202 is assigned based on the results of the analysis. Several features of the App are analyzed, including but not limited to, HTTP communication 1204, automatic start (autostart) 1206, root 1208, Bluetooth® control 1210, Wi-Fi control 1212, Static IP 1214, car Application Programming Interface (API) (for Android Apps) 1216, ports 1218, minimum SDK version 1220, launcher 1222, affinity 1224, install another App 1226.

HTTP communication 1204 may be analyzed to determine if the communication is secure. For example, if HTTP allows intruders to tamper with the communications of the App, a risk exists that intruders may include intentionally malicious attackers, and legitimate but intrusive companies, such as ISPs that inject advertisements into pages.

Autostart 1206 may indicate that an App wants to start automatically upon boot. An App that is registered for a BOOT_COMPLETE event has permission to execute code after reboot without the user activating the App. Autostart could pose a problem in an in-vehicle infotainment unit, which has very specific boot loading requirements that may be tied to vehicle safety mechanisms, such as rearview camera, or other sensors on the vehicle.

Root 1208 may be analyzed to determine if the App is attempting to elevate its permissions by trying to become "root", which is the privileged superuser within the system. Bluetooth® Control 1210 may be analyzed to determine if the App wants to control Bluetooth® power. Wi-Fi control 1212 may be analyzed to determine if the App wants to control Wi-Fi power. Static IP 1214 may be analyzed to determine if the App is querying for domain names. Car API 1216 is analyzed to determine if the App is using car API. Ports 1218 may be analyzed to determine if the App wants to open listening ports. A minimum API version 1220 may be analyzed to determine if the App is using a minimum API level on which the App can run. The launcher 1222 may be analyzed to determine if the App is registering as a default launcher. Affinity 1224 may be analyzed to determine if the App is trying to hijack another App. Install 1226 may be analyzed to determine if the App is trying to install another App.

Based on the results of the analyses, the analyst will assign a score to the category. For example, in FIG. 9A, an overall score 1202 of four, out of five possible stars, was assigned to security. In FIG. 9B, an overall score 1202 of two, out of five possible stars, was assigned to security.

FIGS. 10A and 10B are examples of the analysis 1300 of distraction of the App. Automotive Apps should avoid taking a driver's attention away from the road for non-essential reasons. Features of the App that may result in driver distraction are analyzed and an overall score 1302 is assigned. Volume 1304 may be analyzed to determine if the App uses volume control. Malicious Apps might abuse volume control to affect the driver, for example, ransomware may cause a sudden change in volume that might affect the driver. Screen hijack 1306 may be analyzed to determine if the App tries to hijack the screen. Intrusive advertisements 1308 may be analyzed to determine if the App is using ads, is using automotive friendly ads, or not using ads at all. Advertisements that use video, animations and auto-scrolling may be considered disruptive to driver control because the tempt a driver to interact with the App causing the driver to take their eyes off the road for an extended time.

FIGS. 11A and 11B are examples of the analysis 1400 of privacy of the App and a score 1402 is assigned to the category by the Analyst when the analyst has reviewed the results of the validators. Automotive Apps should have minimal access to privacy data attributed to the driver. Trackers 1404 may be analyzed to determine if the App uses trackers. A tracker is software that is meant to collect data about the user or the App's usages. Trackers 1404 are generally used for analytics. However, private data of the driver and/or the vehicle might be used for marketing purposes. User identifiers 1406 may be analyzed to determine if the App reads user specific identifiers. Hardware identifiers 1408 may be analyzed to determine if the App reads hardware specific identifiers. Paired devices 1410 may be analyzed to determine if the App queries a history of paired devices. Bluetooth® short message service (SMS) 1412 may be analyzed to determine if the App accesses SMS messages. Bluetooth® phone book 1414 may be analyzed to determine if the App accesses the phone book. Bluetooth® call logs 1416 may be analyzed to determine if the App accesses call logs.

FIGS. 12A and 12B are examples of analysis 1500 of maliciousness. A signature-based detection of the App may be analyzed to determine if it is malicious by leading anti-virus engines. FIG. 12A is an example score 1502 of the App that is not detected as malicious. FIG. 12B is an example score 1504 of an App that is detected as malicious.

FIGS. 13A and 13B are examples of analysis 1600 of performance and a score 1602 is assigned to the category by the Analyst when the analyst has reviewed the results of the validators. Resource consumption, including CPU usage, memory usage, and disk write, may be analyzed at different stages, for example boot 1604, when App is activated 1606 and when App is in use 1608.

The reports described with reference to FIGS. 3A through 13B, are examples of just some of the analysis performed during the mediate administrators review. The information generated in the reports may be used by the mediate administrator, along with other comparisons that relate to target attributes assigned by the provider/OEM, to ultimately determine the approval or rejection of the draft App.

Referring again to FIG. 4, upon completion of quality assurance 402 and testing 404, the draft App is ready for review 406, which step is also completed by the mediate administrator 108. During review 406, any testing failures, or changes/comments from the mediate administrator 106 cause the mediate administrator 108 to reject 408 the draft App are compiled in a report. The draft App will be returned 410 to the developer 104, along with the test results and any comments from the mediate administrator 104 that reflect edits necessary to receive approval for the draft App (see B in FIGS. 3 and 4).

Referring again to FIG. 3, the developer 104 should consider the test results and comments provided by the mediate administrator and proceed to edit 308 the draft App as recommended by the mediate administrator. The developer edits 308 the App draft and will again submit the edited draft App to the mediate administrator for another pass through the certification process. The submission and certification processes are repeated as many times as necessary, until which time the draft App review is pre-approved by the mediate administrator. Submission and review are also necessary whenever the developer 104 initiates any edits 145 to an approved version of the App that are not initiated by either the mediate administrator 108 or the OEM 112.

Referring again to FIG. 4, once the mediate administrator approves 410 the draft App, the approved App is returned 414 to the developer and the developer may publish 310 the approved App (see C in FIGS. 3 and 4). Simultaneously, the mediate administrator sends 416 the approved App to the OEM 112 where the approved App undergoes a final sign-off by the OEM (see D in FIGS. 4 and 5).

FIG. 5 is a diagram 500 of the OEM's role in the process. The approved App has already undergone quality assurance, testing, and editing to attain approval by the mediate administrator. Because the mediate administrator has taken on the responsibility for reviewing the App from its draft version to its approved version, the OEM is assured that the mediate administrator's approval of the App means that the App has met the targeting requirements set forth by the OEM and meets the requirements necessary to run properly on the OEM's equipment in the vehicle.

The OEM's own review of the mediate administrator approved App allows the OEM to perform their own review 502 as a final check that the targeting attributes do in fact meet the standards of the OEM. This stage of App approval is significantly simplified from what the OEM would have to do without the work of the mediate administrator.

At this review stage 502, the OEM also has an opportunity to apply any further restrictions 504 to any targeting attributes that the OEM may deem necessary for their desired accessibility within their vehicles.

The OEM may also choose to pre-install 506 the App in the vehicle making it available to a user from within the vehicle without the user having to initiate a download. The OEM signs off 508 on the approved App, so that it is available for a user to download and access when it is published by the developer, i.e., it is live.

In the event updates to the App become necessary or desirable, by either the OEM 112, or the developer 104, the App may be unpublished 312 (see FIG. 3). And a revised, or new, version of the App will be submitted 306 through the certification process as described above. An unpublished App, such as a draft App or an App that was once published but then unpublished for editing, may undergo edits 308 or be created 304 into an updated version of a previously published App. Editing an App prior to its publication requires the developer to submit 306 the draft App to the mediate administrator 108. However, unpublishing 310 to revise the App after its release, requires an entirely new version of a draft App to be created 304 and submitted 306 to the mediate administrator 108 for certification and approval.

The description of embodiments has been presented for purposes of illustration and description. Suitable modifications and variations to the embodiments may be performed according to description herein or may be acquired from practicing the methods. For example, unless otherwise noted, one or more of the described methods may be performed by a suitable device and/or combination of devices, such as the embodiments described above with respect to FIGS. 1-13B. The methods may be performed by executing stored instructions with one or more logic devices (e.g., processors) in combination with one or more hardware elements, such as storage devices, memory, hardware network interfaces/antennas, switches, clock circuits, and so on. The described methods and associated actions may also be performed in various orders in addition to the order described in this application, in parallel, and/or simultaneously. The described systems are exemplary in nature and may include additional elements and/or omit elements. The subject matter of the present disclosure includes all novel and non-obvious combinations and sub-combinations of the various systems and configurations, and other features, functions, and/or properties disclosed.

In the foregoing specification, the present disclosure has been described with reference to specific exemplary embodiments. The specification and figures are illustrative, rather than restrictive, and modifications are intended to be included within the scope of the present disclosure. Accordingly, the scope of the present disclosure should be determined by the claims and their legal equivalents rather than by merely the examples described.

For example, the steps recited in any method or process claims may be executed in any order, may be executed repeatedly, and are not limited to the specific order presented in the claims. Additionally, the components and/or elements recited in any apparatus claims may be assembled or otherwise operationally configured in a variety of permutations and are accordingly not limited to the specific configuration recited in the claims. Any method or process described may be carried out by executing instructions with one or more devices, such as a processor or controller, memory (including non-transitory), sensors, network interfaces, antennas, switches, actuators to name just a few examples.

In the foregoing specification, the present disclosure has been described with reference to specific exemplary embodiments. The specification and figures are illustrative, rather than restrictive, and modifications are intended to be included within the scope of the present disclosure. Accordingly, the scope of the present disclosure should be determined by the claims and their legal equivalents rather than by merely the examples described.

For example, the steps recited in any method or process claims may be executed in any order, may be executed repeatedly, and are not limited to the specific order presented in the claims. Additionally, the components and/or elements recited in any apparatus claims may be assembled or otherwise operationally configured in a variety of permutations and are accordingly not limited to the specific configuration recited in the claims. Any method or process described may be carried out by executing instructions with one or more devices, such as a processor or controller, memory (including non-transitory), sensors, network interfaces, antennas, switches, actuators to name just a few examples.

Benefits, other advantages, and solutions to problems have been described above regarding embodiments: however, any benefit, advantage, solution to problem or any element that may cause any particular benefit, advantage, or solution to occur or to become more pronounced are not to be construed as critical, required, or essential features or components of any or all the claims.

The terms "comprise", "comprises", "comprising", "having", "including", "includes" or any variation thereof, are intended to reference a non-exclusive inclusion, such that a process, method, article, composition, or apparatus that comprises a list of elements does not include only those elements recited but may also include other elements not expressly listed or inherent to such process, method, article, composition, or apparatus. Other combinations and/or modifications of the above-described structures, arrangements, applications, proportions, elements, materials, or components used in the practice of the present disclosure, in addition to those not specifically recited, may be varied, or otherwise particularly adapted to specific environments, manufacturing specifications, design parameters or other operating requirements without departing from the general principles of the same.

What is claimed is:

1. A computer-implemented method for certification of an application software (App) for deployment in a vehicle computing environment, the method comprising the steps of:

granting, through a web-based portal managed by a mediate administrator, secure access to a developer and one or more providers, each of which communicates with the web-based portal through a network interface;

receiving, at the web-based portal, a draft App created by the developer;

executing, by the web-based portal, a certification process comprising automated quality-assurance and validation testing of the draft App against vehicle-specific targeting attributes provided by the one or more providers and generating an automotive grade score computed as an average of privacy, performance, distraction, security, and maliciousness category scores;

performing, by a validation engine of the web-based portal, a plurality of analyses comprising:

performing a static analysis of decompiled code and native libraries of the App to identify permission requests and potential malicious behavior;

performing a dynamic analysis of hooks, data logs, and resource usage of the App within a virtual device simulation of the vehicle computing environment;

performing an external analysis that performs malicious-link scanning and open-source license and vulnerability checks;

aggregating, by the web-based portal, results of the quality-assurance and validation testing and generating either a certification report or a testing failure report;

transmitting, within the web-based portal, the certification report to the developer and to the one or more providers;

transmitting, within the web-based portal, the testing failure report to the developer;

receiving, at the web-based portal an approval indication from at least one of the providers;

automatically signing the approved draft App within the web-based portal to indicate the App as certified for deployment in the vehicle computing environment; and publishing, by the web-based portal, the certified App to an application repository that is accessible from within the vehicle computing environment.

2. The computer-implemented method as claimed in 1, wherein the step of automatically signing the approved draft App further comprises the one or more providers, at the web-based portal, performing the step of modifying the draft App by applying, through the web-based portal, provider-defined restrictions to the approved draft App prior to the step of signing the approved draft App.

3. The computer-implemented method as claimed in claim 1, wherein the step of transmitting the certification report further comprises transmitting the certification to the developer and to the one or more providers simultaneously.

*    *    *    *    *